US010643206B2

(12) United States Patent
Kendrick et al.

(10) Patent No.: US 10,643,206 B2
(45) Date of Patent: May 5, 2020

(54) SYSTEMS AND METHODS FOR INITIATING AND AUTHORIZING TRANSACTIONS USING A DETECTABLE DEVICE

(71) Applicant: Capital One Services, LLC, McLean, VA (US)

(72) Inventors: Jesse N. Kendrick, San Francisco, CA (US); Mohamed Lafeer, Fairfax, VA (US); Jeremy Rephlo, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 79 days.

(21) Appl. No.: 15/948,600

(22) Filed: Apr. 9, 2018

(65) Prior Publication Data
US 2018/0225664 A1 Aug. 9, 2018

Related U.S. Application Data

(60) Division of application No. 15/863,587, filed on Jan. 5, 2018, now Pat. No. 10,296,906, which is a
(Continued)

(51) Int. Cl.
G06Q 40/00 (2012.01)
G06Q 20/40 (2012.01)
(52) U.S. Cl.
CPC .................... G06Q 20/40 (2013.01)
(58) Field of Classification Search
CPC .................................................. G06Q 20/40
(Continued)

(56) References Cited

U.S. PATENT DOCUMENTS 8,666,895 B2 3/2014 Grigg
8,972,297 B2 * 3/2015 Kay .................. G06Q 40/02
705/43

(Continued)

OTHER PUBLICATIONS

International Search Report and the Written Opinion dated Jul. 14, 2015, in counterpart International Application No. PCT/US15/25571, 13 pages.
(Continued)

Primary Examiner — Samica L Norman
(74) Attorney, Agent, or Firm — Finnegan, Henderson, Farabow, Garrett & Dunner, LLP

(57) ABSTRACT

A system for initiating and authorizing a transaction including one or more memory devices storing instructions and one or more processors configured to execute the instructions to associate a detectable device with at least one financial account. The one or more processors may be further configured to receive a notification indicating that the detectable device is involved in a potential transaction initiated by a sensor device detecting the detectable device in an initiating action. The one or more processors may be further configured to receive transaction information associated with the potential transaction. The one or more processors may be further configured to identify a customer profile associated with the detectable device, and determine whether the potential transaction is authorized by a customer based on the transaction information and at least one profile customization parameter associated with the customer profile.

19 Claims, 10 Drawing Sheets

Related U.S. Application Data continuation of application No. 14/685,276, filed on Apr. 13, 2015, now Pat. No. 10,026,084.

(60) Provisional application No. 61/979,181, filed on Apr. 14, 2014.

(58) Field of Classification Search
USPC .......................... 705/17, 21, 43, 44; 235/380
See application file for complete search history.

(56) References Cited

U.S. PATENT DOCUMENTS

| | | | | |
|---|---|---|---|---|
| 9,224,113 | B2* | 12/2015 | Grigg | G06Q 30/06 |
| 2008/0099553 | A1 | 5/2008 | Stevens | |
| 2011/0246316 | A1* | 10/2011 | Cincera | G06Q 20/1085 |
| | | | | 705/17 |
| 2012/0024947 | A1* | 2/2012 | Naelon | G06Q 30/06 |
| | | | | 235/380 |
| 2013/0006860 | A1* | 1/2013 | Balasubramanian | G06Q 20/02 |
| | | | | 705/44 |
| 2013/0290427 | A1 | 10/2013 | Proud | |
| 2014/0012757 | A1 | 1/2014 | Henderson et al. | |
| 2015/0269582 | A1* | 9/2015 | Simmons | G06Q 20/202 |
| | | | | 705/21 |
| 2017/0228704 | A1 | 8/2017 | Zhou | |

OTHER PUBLICATIONS

European Search Report dated Jan. 14, 2020 for Application No. 15 779 238.3-1213.

\* cited by examiner

SYSTEMS AND METHODS FOR INITIATING AND AUTHORIZING TRANSACTIONS USING A DETECTABLE DEVICE

PRIORITY CLAIM

This application is a divisional of U.S. patent application Ser. No. 15/863,587, filed Jan. 5, 2018, which is a continuation of U.S. patent application Ser. No. 14/685,276, filed Apr. 13, 2015, which claims priority to U.S. Provisional Application No. 61/979,181, filed on Apr. 14, 2014, the entire contents of which are hereby incorporated by reference in their entireties.

TECHNICAL FIELD

The disclosed embodiments generally relate to processing transactions, and more particularly, to systems and methods for initiating and authorizing transactions using a detectable device.

BACKGROUND

Typically, customers initiate financial transactions by paying a merchant cash or using a physical card that stores the customer's financial account information. In either case, the customer may have to wait for a merchant employee or a self-service checkout device to become available so that the customer and merchant can conduct the transaction. When a customer uses a card (e.g., debit or credit card), the customer or a merchant employee usually must scan or swipe the card through a device that can read the card and determine which financial account will be used for the transaction. The customer may also have to enter a pin number, provide a signature, and/or confirm the transaction is correct as read by the device before the transaction can be processed and completed.

While this may be a typical manner in which transactions take place, it creates several drawbacks. For example, since each transaction requires the customer to stop and directly interact with the merchant to provide payment and/or payment information, customers are often forced to wait in lines and interact with merchants before they can move on from the transaction (e.g., before they can move into a location for which he/she has paid for entry, leave a store with a purchased item, etc.).

Merchants also experience drawbacks due to typical payment procedures. For example, most merchants must hire and train employees to accept payments from customers and/or operate checkout equipment. Also, physical merchant locations (e.g., retail stores, museums, stadiums, etc.) usually must devote valuable floor space to checkout equipment (and/or ticketing/entry equipment) and an area for customers to wait in line to checkout (and/or enter).

Due to these and other drawbacks associated with current transaction systems, customers and merchants inefficiently spend time and money to conduct transactions. Therefore, a need exists for technology allowing for, among other things, quicker and more efficient means for initiating and authorizing transactions.

SUMMARY

Consistent with disclosed embodiments, systems and methods for initiating and authorizing a transaction using a detectable device are provided.

Consistent with a disclosed embodiment, a system for initiating and authorizing a transaction is provided. The system may include one or more memory devices storing instructions. The system may also include one or more processors configured to execute the instructions to associate a detectable device with at least one financial account. The one or more processors may be further configured to receive a notification indicating that the detectable device is involved in a potential transaction initiated by a sensor device detecting the detectable device in an initiating action, and receive transaction information associated with the potential transaction. The one or more processors may be further configured to identify, by the one or more processors, a customer profile associated with the detectable device, and determine, by the one or more processors, whether the potential transaction is authorized by a customer based on the transaction information and at least one profile customization parameter associated with the customer profile.

Consistent with another disclosed embodiment, a computer-implemented method for initiating and authorizing a transaction is provided. The method may include associating, by one or more processors, a detectable device with at least one financial account. The method may also include receiving a notification indicating that the detectable device is involved in a potential transaction initiated by a sensor device detecting the detectable device in an initiating action, and receiving transaction information associated with the potential transaction. The method may also further include identifying, by the one or more processors, a customer profile associated with the detectable device, determining, by the one or more processors, whether the potential transaction is authorized by a customer based on the transaction information and at least one profile customization parameter associated with the customer profile, and transmitting, by the one or more processors, a result of the determination.

Consistent with another disclosed embodiment, a wearable device for initiating and authorizing a transaction is provided. The device may include one or more memory devices storing instructions. The device may also include one or more processors configured to execute the instructions to receive a notification indicating that the wearable device was wirelessly detected in an initiating action by a sensor device, and initiate a potential transaction based on communication with the sensor device. The one or more processors may be further configured to transmit information stored in the one or more memory devices to a profile management device, and receive a notification that a potential transaction was determined to be authorized by the customer based on at least one profile customization parameter associated with a customer profile associated with the tag device and determined using the transmitted information Consistent with other disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Figure 1A:
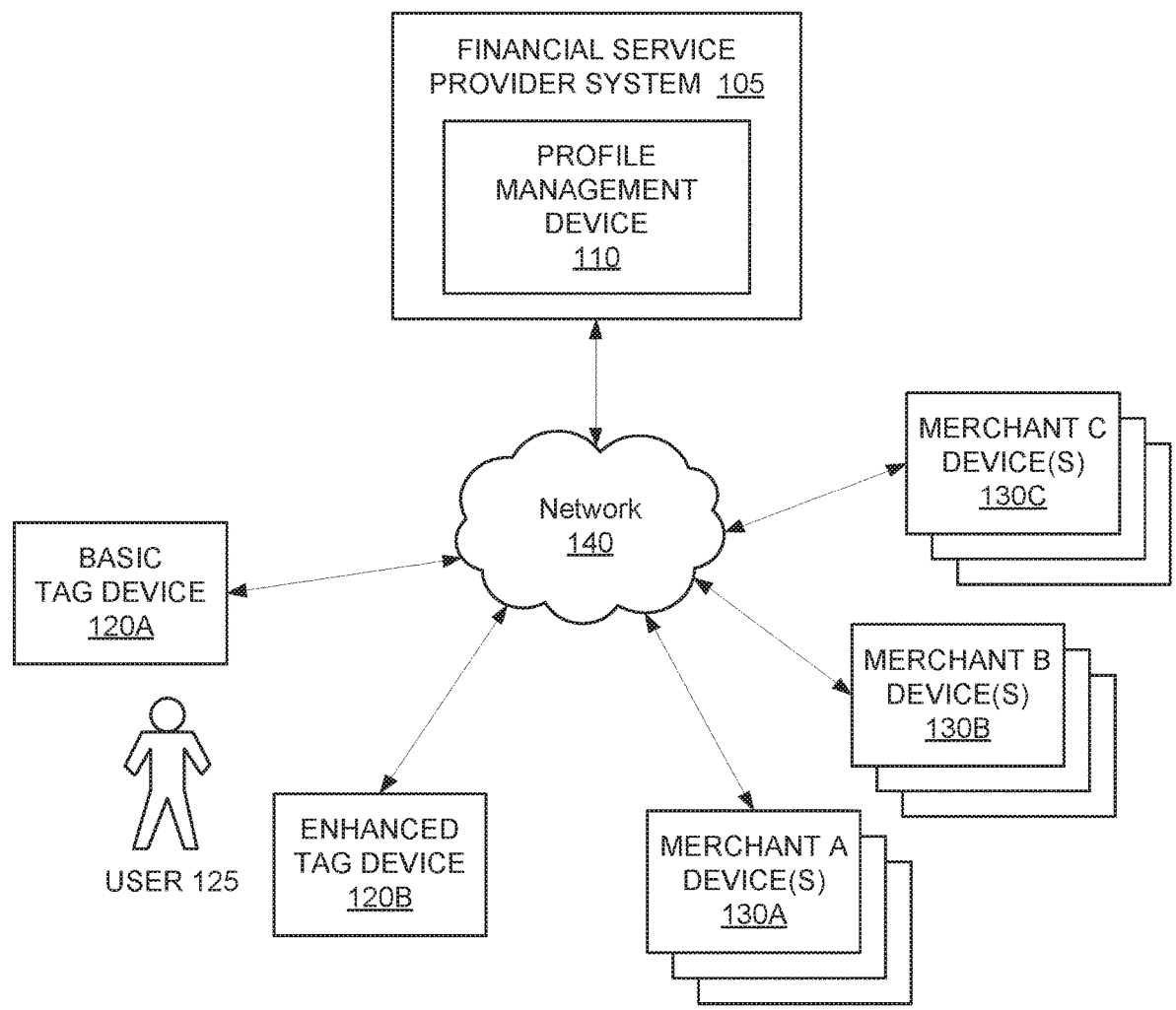
FIG. 1A is a block diagram of an exemplary system, consistent with disclosed embodiments.

Reference will now be made in detail to exemplary embodiments, examples of which are illustrated in the accompanying drawings and disclosed herein. Wherever convenient, the same reference numbers will be used throughout the drawings to refer to the same or like parts.

Disclosed embodiments provide systems and methods for automatically initiating and authorizing a transaction using a detectable device. The detectable device may be associated with a financial account held by the customer with a financial service provider. In an exemplary embodiment, the detectable device may be a tag device, which may be a mobile device configured to be worn or otherwise held, carried, and/or possessed by a user and including some processing and/or storage capability. The tag device may be configured such that a merchant device may detect the tag device and determine that a potential customer transaction should be initiated based on communication with the tag device. The tag device and/or the merchant device may be configured to pre-authorize the transaction between the customer, such as the person wearing the tag device, and a third-party, such as a merchant associated with the merchant device.

Further, in disclosed embodiments, the tag device and/or a merchant device may be configured to communicate with a profile management device that may selectively authorize transactions to allow the customer to use the financial account associated with the tag device to complete the transaction. In some embodiments, the profile management device may determine whether to authorize a transaction based on stored information about the customer, the merchant, and the financial service provider associated with the financial account. For example, in some embodiments, the profile management device may store customer profile information that indicates the criteria under which a potential transaction may be authorized by, for example, a financial service provider. The tag device and/or the merchant device may provide information about a potential transaction to the profile management device, which may make a determination based on the stored customer profile information and other criteria, such as a credit risk analysis. If the profile management device determines that the transaction is authorized by the customer, the merchant, and/or the financial service provider associated with the transaction, the financial service provider may carry out the transaction.

In certain aspects, the disclosed embodiments may be used to conduct tag device transactions. A tag device transaction may be any transaction in which a tag device is included in the process of completing the transaction. For example, a tag device transaction may be an entry-fee transaction in which user makes a payment to a merchant in order to enter an area (e.g., a museum), where the payment is made using the tag device. It should be understood, however, that any transaction made (and/or potential transaction denied) using a tag device may be a tag device transaction.

Each tag device transaction may begin as a potential transaction. That is, the tag device and/or another component may initiate a tag device transaction, however, it may or may not be processed to completion (e.g., transfer/payment of funds). Whether a potential transaction should be completed depends on an authorization determination, which may include one or more security processes.

Tag device transactions may be initiated automatically, such as via wireless communication between the tag device and another component, such as a merchant device. For example, the tag device and the merchant device may each include communication devices that allow for the wireless communication. Each merchant device may be individually configured to interact with a tag device depending on the particular nature of the underlying merchant. For example, a merchant device may be configured to communicate with any tag device that enters a particular area. Once a tag device has entered the area, the merchant device may detect the tag device and begin a process to automatically initiate a potential transaction. If the potential transaction is authorized, the transaction may be completed.

Initiation of potential transactions may also depend on the nature of the tag device used in the transaction. For example, a tag device that lacks a power source may require communication using a passive RFID device. In this example, a user of the tag device may be required to touch the tag device to a merchant device.

In another example, a tag device that has a power source may be configured to communicate automatically with a merchant device (e.g., via a local network, such as a WIFI network), however, all data sent to another connected component may be sent through the merchant device if the tag device lacks sufficient power/capability to communicate outside of the local network.

In yet another example, a tag device may be configured to wirelessly communicate with multiple connected components. For example, the tag device may be configured to communicate with a merchant device, gather information about a potential transaction, and send the information to a profile management device. The tag device and/or the merchant device may also be configured to make an initial authorization determination, such as based on a customer profile stored in the tag device.

In some aspects, a merchant device may detect an operating mode of the tag device. For example, the merchant device may detect that a tag device is in a low-power operating mode and/or an unpowered operating mode and therefore cannot communicate properly to initiate a potential transaction. The merchant device may notify an employee of the merchant and/or the customer such that the customer may take some action to ensure that the transaction is initiated. For example, the customer may touch the tag device to a merchant device to allow a passive RFID communication device to transmit information about the tag device to the merchant device.

In certain aspects, the exemplary disclosed processes may be carried out automatically based on actions of the customer wearing the tag device. For example, the customer may enter a merchant environment to obtain and/or use a product or service, and, in the normal course of doing so, cause a tag device to be detected by a merchant device. For example, a customer may enter a particular area within a merchant environment (e.g., a building/event requiring an entry fee), which may cause the tag device to enter a detectable area of a merchant device associated with the merchant. Once the tag device is in the detectable area, the tag device and merchant device may communicate with each other to share information to determine a potential transaction that should be initiated based on the tag device being detected (e.g., a transaction in which the customer pays the entry fee). Once the potential transaction is determined, information about the potential transaction may be sent to profile the management device for authorization. If the profile management device determines that the transaction is authorized (e.g., all parties to transaction have pre-approved the transaction), the profile management device may cause the transaction to be completed (e.g., the entry fee paid out of the customer's account).

It should be understood that the particular components involved in a process of carrying out a tag device transaction may vary depending on the particular characteristics of the merchant and the nature of the transaction. For example, merchant devices configured to detect and communicate with a tag device may and be specifically tailored to the needs of the associated merchant and thus may vary across merchants. In addition, the configuration of a tag device may depend on the types of transactions that it is used in and the functionality requirements necessary to allow the tag device to carry out the transactions efficiently and securely. Examples of systems and system components that may be used to carry out tag device transactions will now be described.

Figure 1B:
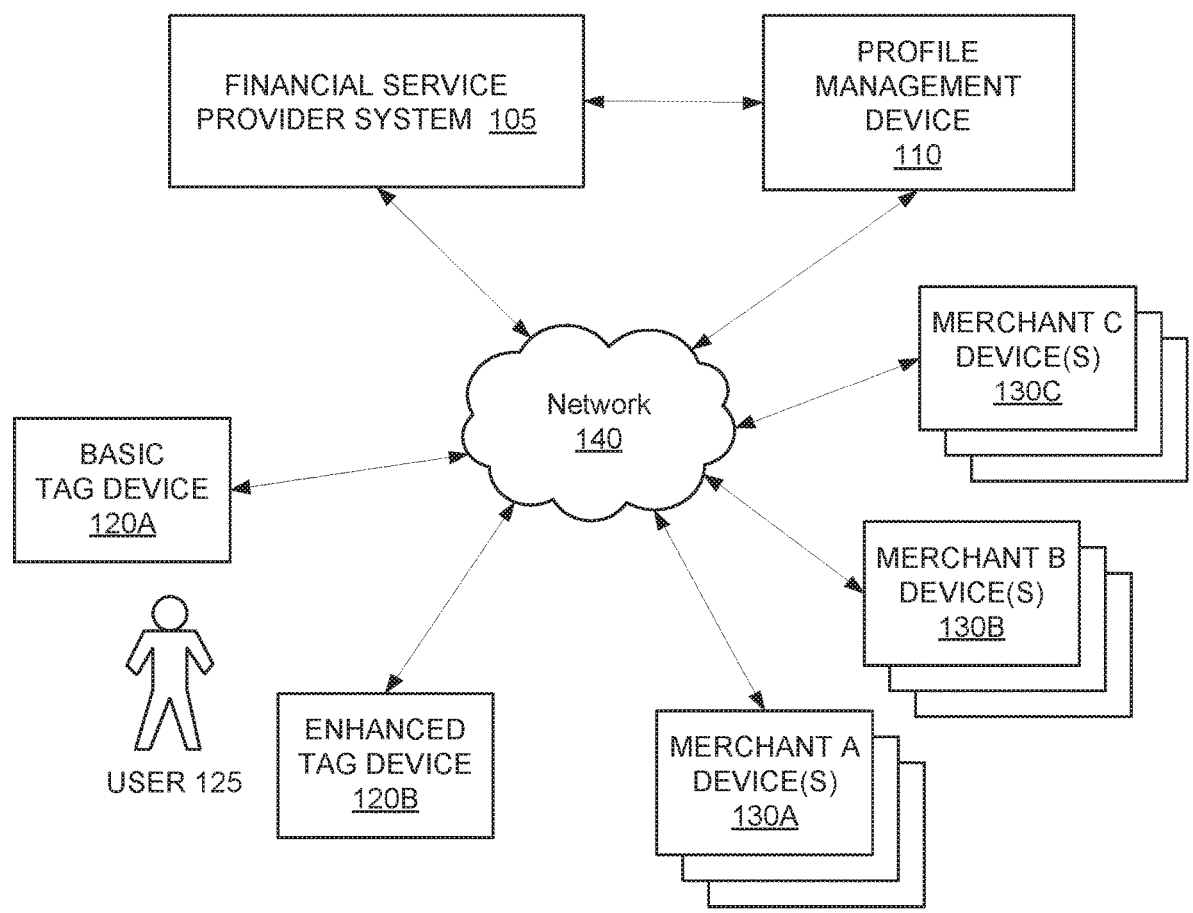
FIG. 1B is a block diagram of another exemplary system, consistent with disclosed embodiments.

FIG. 1A shows a first exemplary system 100A that may be configured to perform one or more processes consistent with disclosed embodiments. FIG. 1B shows an alternative exemplary system 100B. In certain aspects, one or more components of systems 100A and 100B may be configured to execute one or more software processes to provide one or more aspects of the disclosed embodiments. The components and arrangement shown in FIGS. 1A and 1B are not intended to be limiting to the disclosed embodiment as the components used to implement the processes and features disclosed here may vary.

In accordance with certain disclosed embodiments, system 100A may include a financial service provider system 105, a profile management device 110, a basic tag device 120A, an enhanced tag device 120B, a plurality of merchant devices 130A, 130B, and 130C, and a network 140. Other components known to one of ordinary skill in the art may additionally or alternatively be included in system 100A to process, transmit, provide, and receive information consistent with the disclosed embodiments. In the exemplary embodiment of FIG. 1A, profile management device 110 may be a component of financial service provider system 105.

As shown in FIG. 1B, system 100B may be similar to system 100A, except that profile management device 110 may be a separate component from financial service provider system 105. For example, in some embodiments consistent with system 100B, profile management device 110 may be a component maintained and managed by a third-party entity, which may or may not be associated with a financial service provider (e.g., a financial service provider associated with financial service provider system 105).

Financial service provider system 105 may be one or more computer systems associated with an entity that provides financial services. For example, the entity may be a bank, credit union, credit card issuer, or other type of financial service entity that generates, provides, manages, and/or maintains financial service accounts for one or more users. Financial service accounts may include, for example, credit accounts, checking accounts, savings accounts, loan accounts, reward accounts, and any other types of financial service account known to those skilled in the art.

Financial service accounts may be associated with physical financial service account products. For example, financial service accounts may be associated with a physical card that a user may carry on their person and use to perform financial service transactions, such as purchasing goods and/or services at a point of sale (POS) terminal. In exemplary disclosed embodiments, financial service accounts may be associated with a physical tag device, such as basic tag device 120A and/or enhanced tag device 120B. A tag device may be associated with and allow a customer to conduct transactions using one or more financial service accounts in a manner similar to that of a physical card. For example, a tag device may be configured to communicate with a merchant device (e.g., one of merchant devices 130A-C) to provide financial account information during processing of a transaction between a customer and a merchant.

Financial service accounts may also be associated with electronic financial products and services, such as a digital wallet or similar account that may be used to perform electronic transactions, such as purchasing goods and/or services online. In some embodiments, a tag device may be configured to access an electronic financial product and/or communicate with a client device that has access to an electronic financial product, such that the tag device may be involved in an online transaction (e.g., authorize the transaction). Exemplary disclosed tag devices, including tag devices 120A and 1208, will be described in more detail below.

Financial service provider system 105 may include infrastructure and components that are configured to generate and provide financial service accounts and financial service account products (e.g., tag devices, cards, etc.). Financial service provider system 105 may also include infrastructures and components that are configured to store transactional data associated with the financial service accounts. Consistent with disclosed embodiments, financial service provider system 105 may include components configured to communicate with profile management device 110. For example, as shown in FIG. 1A, profile management device 110 may be a component of financial service provider system 105, which may allow for data communication between associated computing devices. In other embodiments, such as those depicted by FIG. 1B, profile management device 110 may be a separate component, which financial service provider system 105 may communicate with over network 140, a dedicated communication line, and/or other electronic connection.

Profile management device 110 may be one or more computer systems. For example, profile management device 110 may include a server configured to communicate with other components of systems 100A and 100B. Profile management device 110 may be configured to receive information associated with a customer and store the information as a customer profile.

In an exemplary embodiment, a customer profile may include any information associated with a customer that may be used to process, complete, authorize, and/or otherwise conduct a transaction, such as a payment, a transfer of funds, a refund, an exchange, etc. In one embodiment, a customer profile may include one or more profile customization parameters that indicate the criteria under which a potential transaction may be authorized, unauthorized, and/or require additional information. For example, a customer profile may include information indicating that all potential transactions associated with a particular merchant are authorized. In another example, a customer profile may include information indicating that all potential transactions over a certain amount require additional authorization (e.g., customer input) before the transaction can be authorized.

Profile management device 110 may be configured to receive information about potential transactions from basic tag device 120A, enhanced tag device 120B, and/or one or more of merchant devices 130A-C. Profile management device 110 may compare information about a potential transaction to stored information associated with a customer profile to make transaction processing determinations. For example, profile management device 110 may determine that a potential transaction is authorized, unauthorized, requires further action, etc. Based on a determination, profile management device 110 may transmit information to other components of systems 100A and 100B (e.g., indicating that a transaction was authorized, instructing financial service provider system 105 to process the transaction, etc.).

Basic tag device 120A and enhanced tag device 120B may be similar devices configured to perform similar functions, although in at least some embodiments enhanced tag device 120B may include additional and/or alternative components and/or functionality compared to basic tag device 120A. Basic tag device 120A and enhanced tag device 120B may be mobile computing devices configured to communicate with other components of systems 100A and 100B to perform one or more processes consistent with disclosed embodiments. For example, basic tag device 120A and enhanced tag device 120B may include memory devices configured to store information that may be transmitted to a merchant device (e.g., one of merchant devices 130A-C) for use in processing a transaction.

In an exemplary embodiment, basic tag device 120A and enhanced tag device 120B may be wearable devices. A wearable device may be any device configured to be worn or carried by a user, such as a user 125. For example, basic tag device 120A and/or enhanced tag device 120B may be incorporated into a wearable item such as a wristband, jewelry, eyeglasses, sunglasses, watch, piece of clothing (e.g., shirt, shoe, pants, jacket, etc.), etc., may include an attachment device (e.g., a clip) to allow it to be attached to a wearable item (e.g., belt), may be incorporated into an item that is normally carried by a user or held in the user's pocket (e.g., smartphone, wallet, keys), and the like. In some embodiments, basic tag device 120A and/or enhanced tag device 120B may be a component of or incorporated into a commercially available wearable computing device, such as Google Glass®, a smartwatch, etc.

In some embodiments, basic tag device 120A and/or enhanced tag device 120B may be configured to communicate with another client device, such as a mobile device (e.g., smartphone, tablet, laptop, etc.). In some embodiments, the client device may be configured with memory devices that store one or more operating systems that perform known operating system functions when executed by one or more processors. By way of example, the operating systems may include Microsoft Windows™, Unix™, Linux™, Apple™ Computers type operating systems, mobile operating systems, such as Apple iOS™ or an Android™ operating system, Personal Digital Assistant (PDA) type operating systems, such as Microsoft CE™, or other types of operating systems. Accordingly, embodiments of the disclosed invention will operate and function with computer systems running any type of operating system.

Basic tag device 120A, enhanced tag device 120B, and/or a connected client device may also include memory devices storing communication software that, when executed by a processor, allows for communication with network 140, such as Web browser software, tablet or smart hand held device networking software, etc. In some embodiments, basic tag device 120A, enhanced tag device 120B, and/or a connected client device may be a device configured to store and execute one or more mobile applications.

In one embodiment, user 125 may use basic tag device 120A in transaction (e.g., a financial transaction), such as by wearing the device or a part of the device. For example, user 125 may wear a watch or wristband into which basic tag device 120 is integrated. While wearing basic tag device 120A, user 125 may enter a merchant environment, such as a retail store. Based on one or more actions of user 125 in the merchant environment, a merchant device, such as merchant device 130A, may detect and communicate with basic tag device 120A. For example, merchant device 130A may detect basic tag device 120A performing an initiating action. An initiating action may be any action involving a tag device, such as basic tag device 120A, that may be detected by a component of systems 100A and/or 100B, including the tag device itself, and indicating that a potential transaction may have been attempted. Examples of initiating actions may include basic tag device 120A (and/or enhanced tag device 120B) entering a designated area (e.g., a building, a vehicle, etc.), moving between two designated areas (e.g., two subway stations, an entrance and an exit to a building, etc.), receiving user input (e.g., item information, split-bill information, etc.), etc.

Based on detection of the initiating action, basic tag device 120A and/or merchant device 130A may initiate a potential transaction associated with the actions of user 125 and basic tag device 120A. After a potential transaction is initiated, additional processing may take place to determine if the transaction is authorized, and, if so, to complete the transaction.

One example of a situation in which basic tag device 120A may be used to conduct a transaction includes a customer using basic tag device 120A to pay for public transportation, such as for a ride on a public transportation bus requiring a fee to ride. The customer (e.g., user 125) may initially set up a profile that is stored by profile management device 110, associating a basic tag device 120A with a financial account. The customer may wear the basic tag device 120A, such as by wearing a piece of clothing that includes an integrated basic tag device 120A. A merchant device, such as merchant device 130B, may be arranged on the bus such that, as the customer enters the bus, the merchant device detects basic tag device 120A. In other words, the merchant device detects basic tag device 120A in the initiating action of entering the designated area of the bus.

Based on the detection, the merchant device may communicate with basic tag device 120A such that information, such as customer-identifying information stored on basic tag device 120A, is shared between the devices. The merchant device may send information associated with the potential transaction, including the identifying information, to profile management device 110. Profile management device 110 may determine the financial account associated with tag device 120A based on the identifying information and execute software instructions to perform a process to authorize and complete the transaction. In this way, the customer enters the bus and prepares for riding without stopping to pay for entry. The customer may pay for entry onto the bus simply by entering the bus while wearing basic tag device 120A.

Basic tag device 120A may be used in this and other exemplary processes to automatically cause transactions to occur without requiring a formal "checkout" process to conduct a transaction. A customer may use enhanced tag device 120B in a similar manner. Enhanced tag device 120B, however, may allow for additional functionality, such as communication with network 140 and receipt of input from user 125, among other things. For example, enhanced tag device 120B may include components that allow user 125 to provide additional information about a potential transaction, such as a touchscreen display and/or other I/O devices.

One example of a situation in which enhanced tag device 120B may be used for a tag device transaction includes a customer purchasing an item at a retail store. Much like basic tag device 120A, enhanced tag device 120B may be associated with a financial account held by the customer (e.g., user 125). The customer may wear enhanced tag device 120B, such as by wearing a wristband to which enhanced tag device 120B is connected or otherwise integrated. As the customer enters the retail store, a merchant device, such as merchant device 130C, may detect that enhanced tag device 120B is inside the store (e.g., detect the initiating action of enhanced tag device 120B entering the store). In some instances, the merchant device may execute software instructions to perform one or more processes to determine whether the enhanced tag device 120B is approved for use in transactions at the retail store. If not, the merchant device may cause the customer to be alerted (e.g., by a merchant employee or through enhanced tag device 120B itself) so that the customer is aware that a tag device transaction is unavailable.

After entering the retail store, the customer may proceed to shop and select an item for purchase. The customer may use enhanced tag device 120B to identify the item to be purchased. For example, enhanced tag device 120B may scan a barcode associated with the item. As the customer approaches an exit to the retail store with the item, the merchant device may again detect enhanced tag device 120B, which may share information with the merchant device. For example, enhanced tag device 120B may provide identifying information and information about the item to be purchased. The merchant device 120B may receive this information and send it to profile management device 110 for processing. Profile management device 110 may arrange for a payment in an amount equal to the cost of the item to be transferred from the customer's associated financial account to the merchant to complete the purchase transaction. Through this exemplary process, the customer may select a retail item to purchase, identify the item with enhanced tag device 120B, and exit the store with the item, avoiding a formal "checkout" process that may take up time and resources of the merchant.

These and other exemplary tag device transaction processes may allow a customer to wear a tag device, such as basic tag device 120A and/or enhanced tag device 120B, and selectively cause transactions to occur based on their actions. Exemplary configurations of basic tag device 120A and enhanced tag device 120B will be described in more detail below.

A tag device transaction may be any transaction in which a tag device is included in the process of completing the transaction. For example, a tag device transaction may be an entry-fee transaction in which user 125 makes a payment to a merchant in order to enter an area (e.g., a museum), where the payment is made using the tag device. It should be understood, however, that any transaction made (and/or potential transaction denied) using a tag device may be a tag device transaction.

Each tag device transaction may begin as a potential transaction. That is, the tag device and/or another component of systems 100A and/or 100B may initiate a tag device transaction. It may or may not, however, be processed to completion (e.g., transfer/payment of funds). Whether a potential transaction should be completed depends on an authorization determination, which may include one or more security processes.

Tag device transactions may be initiated automatically via wireless communication between the tag device and another component of system 100A and/or 100B, such as a merchant device 100A. As has been described, the tag device and the merchant device may each include communication devices that allow for the wireless communication. Each merchant device (e.g., merchant devices 100A-C) may be individually configured to interact with a tag device depending on the particular nature of the underlying merchant (e.g., merchant A, B, or C). For example, a merchant device 100A may be configured to communicate with any tag device that enters a particular area. Once a tag device has entered the area, merchant device 100A may detect the tag device and begin a process to automatically initiate a potential transaction. If the potential transaction is authorized, the transaction may be completed.

Initiation of potential transactions may also depend on the nature of the tag device used in the transaction. For example, a basic tag device 120A and/or an enhanced tag device 120B in an unpowered mode may require communication using a passive RFID device, since electrical power is unavailable. In this example, user 125 may be required to touch the tag device to a merchant device.

In another example, a basic tag device 120A that has a power source and/or an enhanced tag device 120B in a low-power mode may be configured to communicate automatically with a merchant device (e.g., via a local network, such as a WIFI network), however, all data sent to another component of system 100A and/or 100B (e.g., profile management device 110) may be sent through the merchant device, since the tag device lacks sufficient power/capability to communicate outside of the local network.

In yet another example, an enhanced tag device 120B in a normal-power mode may be configured to wirelessly communicate with multiple components of systems 100A and 100B. For example, the tag device may be configured to communicate with a merchant device, gather information about a potential transaction, and send the information to profile management device 110. The enhanced tag device 120B in normal-power mode may also be configured to make an initial authorization determination, such as based on a customer profile stored in the tag device.

In some aspects, a merchant device (e.g., merchant device 130A-C) may detect an operating mode of the tag device. For example, merchant device 130A may detect that an enhanced tag device 120B is in a low-power operating mode and/or an unpowered operating mode and therefore cannot communicate properly to initiate a transaction. Merchant device 130A may notify an employee of merchant A and/or user 125 such that the user 125 may take some action to ensure that the transaction is initiated. For example, the user 125 may touch the enhanced tag device 120B to a merchant device 130A to allow a passive RFID communication device to transmit information about the tag device to merchant device 130A.

Further, tag device transaction processes may include various security and authorization features that may be implemented to help ensure that only tag device transactions that are approved by all parties (e.g., customer, merchant, financial service provider, and any others) are processed, while unauthorized transactions are stopped before completion. In some aspects, components of systems 100A and 100B, such as merchant devices 130A-130C, may be arranged to incorporate such features to provide a sufficient degree of security to tag device transactions.

Merchant devices 130A-130C may each be one or more computer systems associated with a merchant or other third party. While merchant device 130A is referred to below, it should be understood that the description may be representative of merchant devices 130B and 130C.

Merchant device 130A may include one or more computing systems that are configured to perform computer-implemented processes, such as a server, desktop, laptop, mobile device, etc. As shown in FIGS. 1A and 1B, merchant device 130 may include a plurality of devices. For example, merchant device may include a device configured to communicate with basic tag device 120A and/or enhanced tag device 120B and a device configured to process a transaction through communication with financial service provider system 105.

Merchant device 130A may be associated with an entity that transacts with customers. For example, the merchant may be an entity that provides goods and/or services (e.g., a museum, stadium, taxi, subway system, retail store, etc.). Merchant devices 130A may be associated with a merchant A, merchant devices 130B may be associated with a merchant B, and merchant devices may be associated with a merchant C. It should be understood, however, that systems 100A and 100B may include any number of merchants associated with any number of merchant devices.

Merchant devices 130A may include computing devices configured to execute software instructions to perform one or more processes to conduct transactions with customers (e.g., POS terminal(s), kiosks, etc.). Merchant devices 130A may be associated with a merchant who provides electronic shopping mechanisms, such as a website or a similar online location that consumers (e.g., user 125) may access using a computer through browser software, a mobile application, or similar software. Merchant devices 130A may include computing devices that may include back and/or front-end computing components that process transactions and store consumer transaction data and execute software instructions to perform operations consistent with the disclosed embodiments, such as computers that are operated by employees of merchant 130A (e.g., back-office systems, etc.).

In one embodiment, each of merchant A, B, and C may each be associated with a different type of merchant. For example, merchant A may be associated with an entry-fee merchant, in which a customer may pay for entry into a location, such as a museum or a stadium. Merchant B may be associated with a transportation merchant, such as a subway, a taxi, or a bus. Merchant C may be associated with a retail merchant that sells goods and/or services, such as a grocery store, department store, clothing store, or electronics store. Merchant C may include a brick-and-mortar location that the customer (e.g., user 125) may physically visit to purchase goods and/or services, as well as an online service that the customer may use to make online purchases. It should be understood that these types of merchants are exemplary, and any other merchant may include a merchant device with the components described herein.

In accordance with certain aspects of the disclosed embodiments, one or more computing devices associated with merchants A, B, and C may include detection components configured to detect a tag device (e.g., basic tag device 120A and/or enhanced tag device 120B). For example, merchant devices 130A-C may include a sensor device configured to detect a tag device that is located within a particular area within a range of the sensor device. The sensor device may use, for example, Bluetooth®, NFC, Wi-Fi, Geo-Fencing, RFID, radio waves, and the like, and/or a combination of communication or authorization technologies to detect a tag device. Merchant devices 130A-C may also include a transaction processing device configured to receive information from basic tag device 120A and/or enhanced tag device 120B, such as customer financial information stored by basic tag device 120A.

The configuration and arrangement of detection devices and communication devices associated with any of merchants A, B, and C may depend on the characteristics of the associated merchant. For example, an entry-fee merchant A may include detection devices configured to detect a tag device that has entered into a particular area, and communicate the information with a back-end transaction processing device. A transportation merchant B may include a detection device configured to detect whenever a tag device has entered a transportation station and/or vehicle, such as a subway car or taxi, as well as to detect when the tag device has exited the vehicle. Transportation merchant B may use a more compact and mobile computing device as a transaction processing device, since space may be limited. Retail merchant C may include detection devices configured to detect a tag device in conjunction with information about a potential purchase by a customer wearing the tag device. As described above, an enhanced tag device may provide information about a potential purchase, such as identification of an item to be purchased. In another example, detection devices associated with a retail merchant C may be configured to detect an item in the vicinity of a tag device exiting the retail merchant location, indicating that the customer intends to purchase the item. Retail merchant C may include back-end transaction processing devices configured to communicate with the detection devices and financial service provider system 105, for example.

Network 140 may be any type of network that provides communications, exchanges information, and/or facilitates the exchange of information between components of systems 100A and 100B. In one embodiment, network 140 may be the Internet, a Local Area Network, or other suitable connection(s) that enables systems 100A and 100B to send and receive information between the respective components. In other embodiments, one or more components of systems 100A and 100B may communicate directly through a dedicated communication link(s) (not shown), such as a link between financial service provider system 105 and a merchant device 130A.

Figure 2:
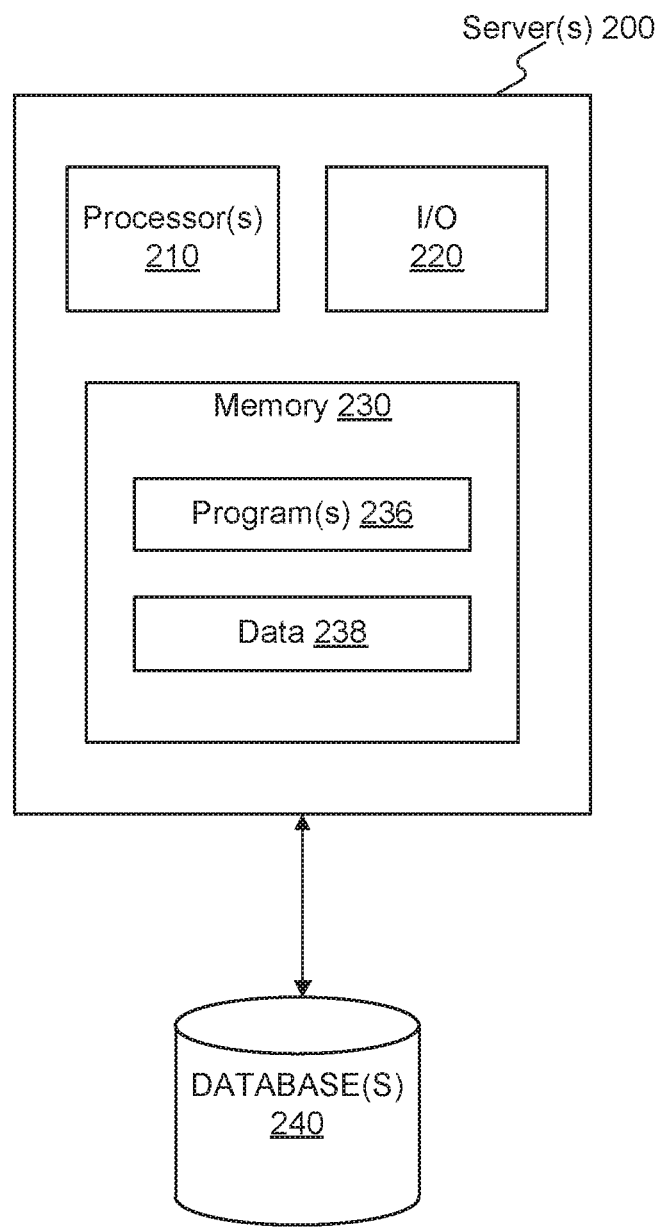
FIG. 2 is a block diagram of an exemplary server, consistent with disclosed embodiments.

FIG. 2 depicts a server 200. In an exemplary embodiment, financial service provider device 105 may include server 200. For example, server 200 may be representative of profile management device 110. It should be understood, however, that although server 200 may be depicted and described herein as a component of financial service provider system 105 for ease of discussion, server 200 or variations thereof may be used alternatively or additionally by basic tag device 120A, enhanced tag device 120B, any of merchant devices 130A-C, a profile management device 110 that is separate from financial service provider system 105 (e.g., as in system 100B) and/or other components of systems 100A and/or 100B (shown and not shown) to perform processes consistent with disclosed embodiments.

In one embodiment, server 200 may include one or more processors 210, one or more input/output (I/O) devices 220, and one or more memories 230. Server 200 may take the form of a mobile computing device, general purpose computer, a mainframe computer, or any combination of these components. According to some embodiments, server 200 may comprise web server(s) or similar computing devices that generate, maintain, and provide web site(s) consistent with disclosed embodiments. Server 200 may be standalone, or it may be part of a subsystem, which may be part of a larger system. For example, server 200 may represent distributed servers that are remotely located and communicate over a network (e.g., network 140) or a dedicated network, such as a LAN.

Processor 210 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 200.

I/O devices 220 may be one or more devices configured to allow data to be received and/or transmitted by server 200. I/O devices 220 may include one or more user I/O devices and/or components, such as those associated with a keyboard, mouse, touchscreen, display, etc. I/O devices 220 may also include one or more digital and/or analog communication devices that allow server 200 to communicate with other machines and devices, such as other components of system 100.

Memory 230 may include one or more storage devices configured to store instructions used by processor 210 to perform functions related to disclosed embodiments. For example, memory 230 may be configured with one or more software instructions associated with programs 236 and/or data 238. Memory 230 may include a single program 236 that performs the functions of the server 200, or multiple programs 236. Additionally, processor 210 may execute one or more programs located remotely from server 200. For example, any of the components of systems 100A and 100B, may, via server 200, access one or more remote programs that, when executed, perform functions related to disclosed embodiments. Memory 230 may also store data 238 that may reflect any type of information in any format that the system may use to perform operations consistent with the disclosed embodiments.

Server 200 may also be communicatively connected to one or more database(s) 240. Server 200 may be communicatively connected to database(s) 240 through network 140. Database 240 may include one or more memory devices that store information and are accessed and/or managed through server 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 200 may include database 240. Alternatively, database 240 may be located remotely from the server 200. Database 240 may include computing components (e.g., database management system, database server, etc.) configured to receive and process requests for data stored in memory devices of database(s) 240 and to provide data from database 240.

Figure 3:
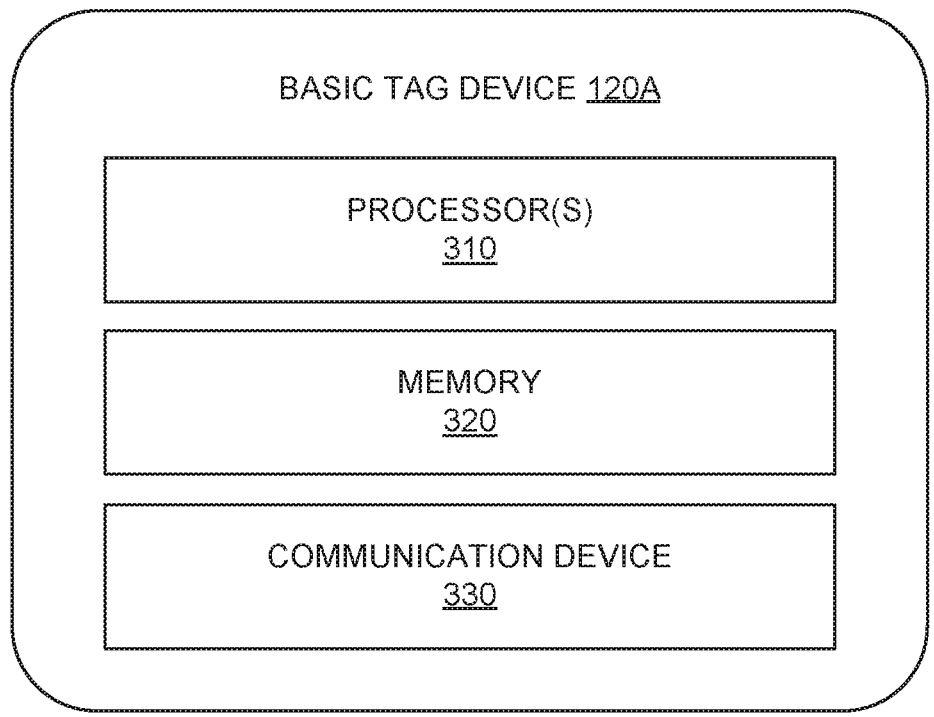
FIG. 3 is a block diagram of an exemplary basic tag device, consistent with disclosed embodiments.

FIG. 3 depicts an exemplary basic tag device 120A, consistent with disclosed embodiments. In one embodiment, basic tag device 120A may include components that may execute one or more processes to initiate and authorize a transaction. As shown in FIG. 3, basic tag device 120A may include a processor 310, a memory device 320, and a communication device 330.

Processor 310 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in basic tag device 120A.

Memory device 320 may include one or more storage devices configured to store information, such as customer information for use in conducting a financial transaction. In some embodiments, memory device 320 may store instructions that may be executed by a processor, such as processor 310. Memory device 320 may store data that may reflect any type of information in any format that the system may use to perform operations consistent with the disclosed embodiments.

In some embodiments, processor 310 may execute one or more programs stored by memory device 320. For example, processor 310 may execute a transaction program configured to provide customer information to a merchant device when basic tag device 120A is detected. Further, in some embodiments, processor 310 may be omitted or have limited capability, such as in instances in which an external processor may execute instructions stored in memory device 320.

Communication device 330 may be an electronic communication device configured to allow basic tag device 120A to communicate with other components of systems 100A and 100B. In an exemplary embodiment, communication device 330 may be near-field communication (NFC) device configured to communicate with another computing device, such as a merchant device 130A. In some embodiments, the NFC device may be a passive RFID device, in which power is supplied to processor 310 and memory device 320 through the passive RFID device in communication with another device, such as a powered RFID device. In other embodiments, communication device 330 may be a cellular communication device configured to communicate with a cellular network, which may be network 140. In certain embodiments, basic tag device 120A may include a power supply, such as a rechargeable battery, configured to provide electrical power to one or more components of basic tag device 120A, such as processer 310 and communication device 330.

Figure 4:
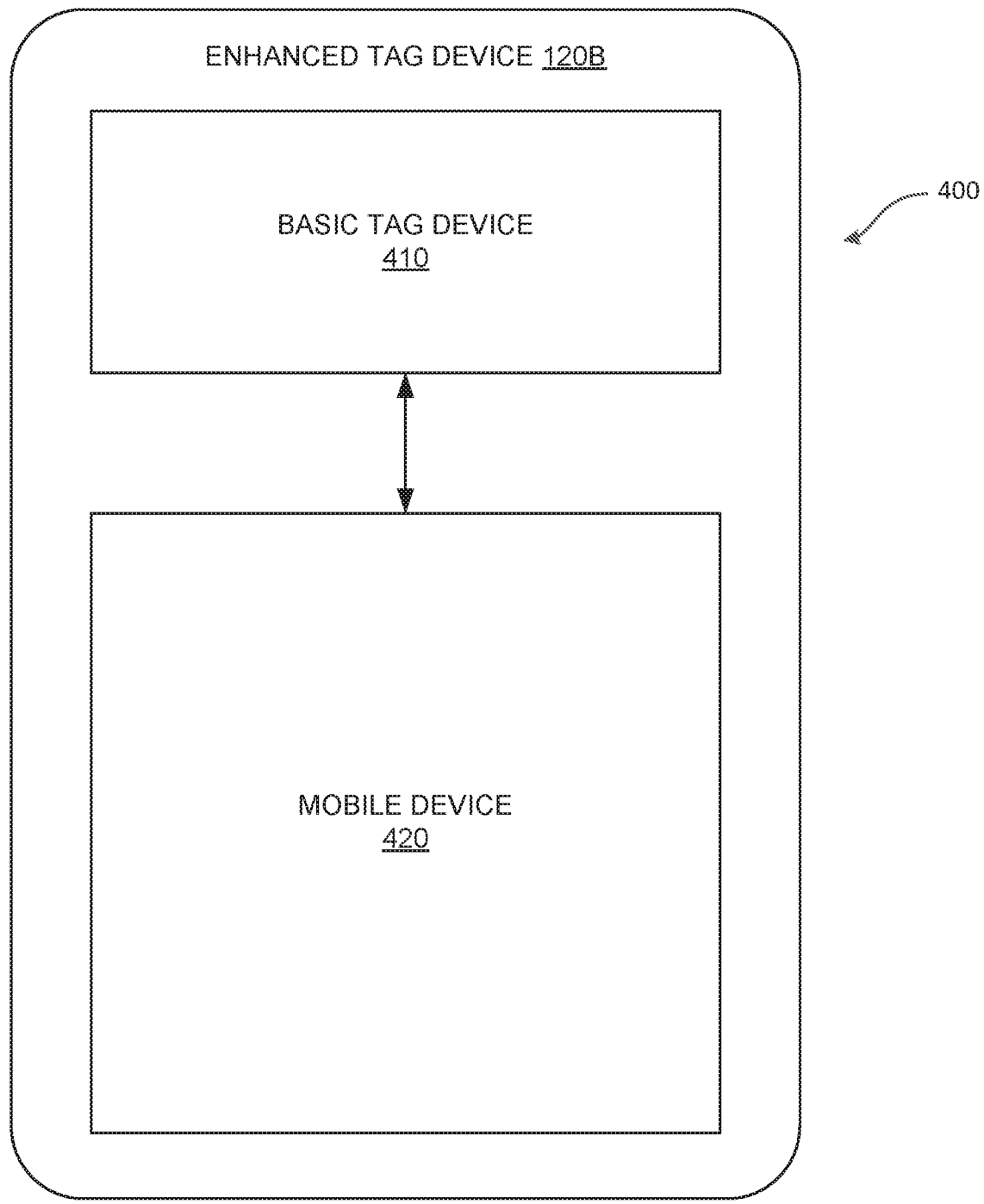
FIG. 4 is a block diagram of an exemplary enhanced tag device, consistent with disclosed embodiments.

FIG. 4 depicts an enhanced tag device 400, which may be an example of an enhanced tag device 120B, consistent with disclosed embodiments. Enhanced tag device 400 may be similar to basic tag device 120A, with additional and/or alternative components that provide enhanced functionality. As shown in FIG. 4, enhanced tag device 400 may include a basic tag device 410 (which may be the same or similar to basic tag device 120A) in communication with a separate client device that provides some or all of the additional components of enhanced tag device 400. For example, enhanced tag device 400 may include basic tag device 410 in communication with a mobile device 420. Mobile device 420 may be a computing device, such as a smartphone, tablet, laptop computer, etc. Basic tag device 410 may communicate with mobile device 420 to provide the expanded functionality of enhanced tag device 400. For example, basic tag device 410 may send information stored in a memory to mobile device 420 for display to the user 125. Similarly, mobile device 420 may transmit information entered by user 125 to basic tag device 410 for use in one or more processes, such as authorization of a transaction.

In some embodiments, mobile device 420 may be configured to store and execute a mobile application associated with enhanced tag device 400. The mobile application may include software instructions that mobile device 420 may execute to perform various processes associated with tag device transactions. For example, the mobile application may be executed to interact with other components of systems 100A and 100B and user 125 to receive and send information associated with a tag device transaction.

Figure 5:
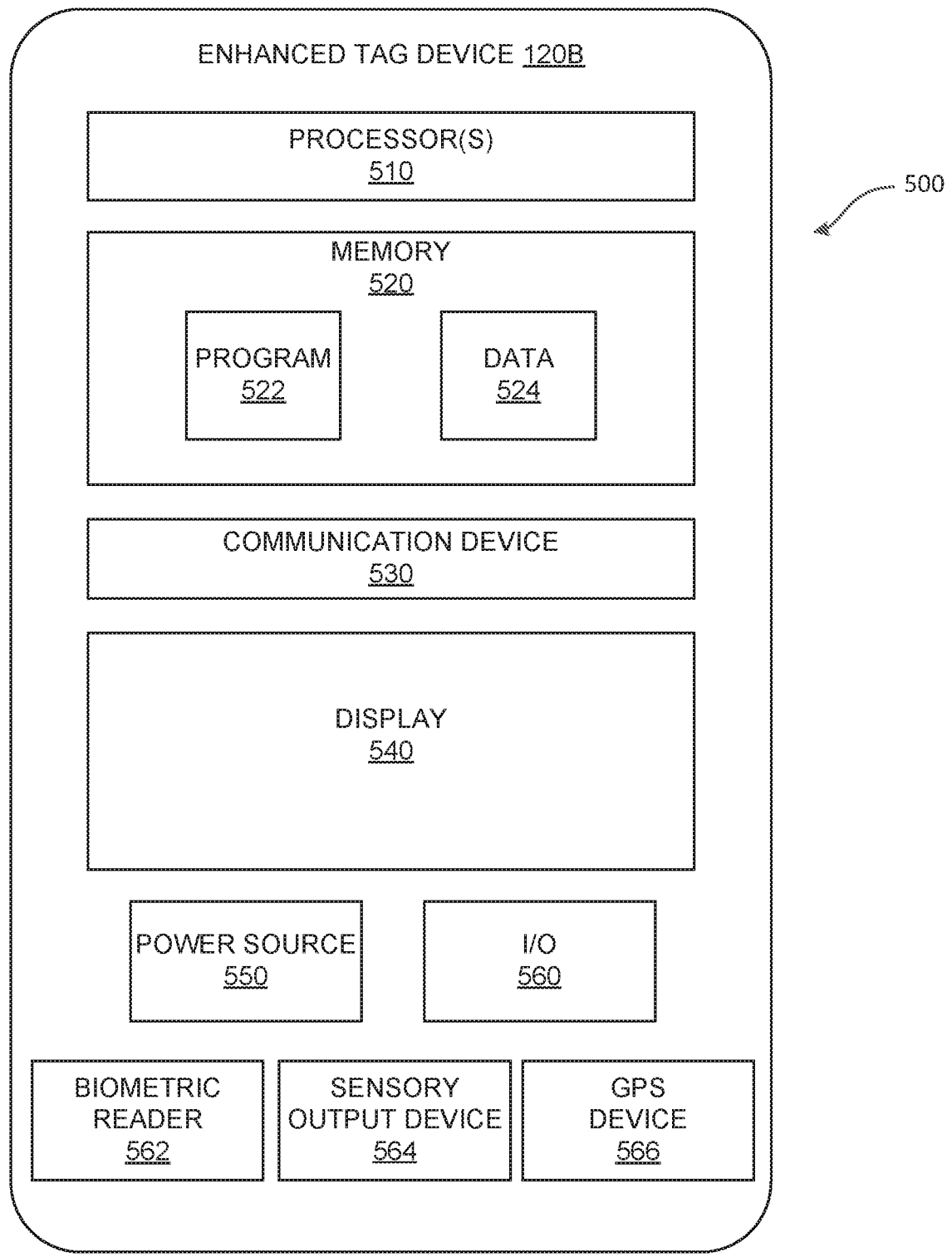
FIG. 5 is a block diagram of another exemplary enhanced tag device, consistent with disclosed embodiments.

FIG. 5 depicts an exemplary enhanced tag device 500, which may be another example of an enhanced tag device 120B, consistent with disclosed embodiments. Enhanced tag device 500 may be configured to be worn by a user, such as user 125. For example, enhanced tag device 500 may be configured to be worn around user 125's wrist. Enhanced tag device 500 may be similar to enhanced tag device 400, with additional or alternative features integrated into one wearable device. For example, enhanced tag device 500 may include at least one processor 510, at least one memory 520, a communication device 530, a display 540, a power source 550, and I/O devices 560, which may include a biometric reader 562, a sensory output device 564, and a GPS device 566.

Processor 510 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in enhanced tag device 500.

Memory 520 may include one or more storage devices configured to store instructions used by processor 510 to perform functions related to the disclosed embodiments. For example, memory 520 may be configured with one or more software instructions associated with programs 522 and/or data 524. Memory 520 may include a single program 522 that performs the functions of enhanced tag device 500, or multiple programs. Additionally, processor 510 may execute one or more programs stored remotely from enhanced tag device 500, such as a program stored by a merchant device 130A. Memory 520 may also store data 524, which may be any data that may reflect any type of information in any format that the system may use to perform operations consistent with the disclosed embodiments.

In some embodiments, memory 520 may store one or more mobile applications configured to be executed by processor 510. For example, memory 520 may store a financial service provider application that allows enhanced tag device 500 to access customer information stored by financial service provider system 105. Processor 510 may execute the financial service provider application to communicate with financial service provider system 105 to selectively provide information, such as customer financial information, that may be displayed to user 125 via display 540. In another example, enhanced tag device 500 may receive data input from user 125 through an I/O device, which may be transmitted to financial service provider system 105 over network 140. In this way, user 125 may manage one or more financial accounts using enhanced tag device 500.

Communication device 530 may be any device that allows enhanced tag device 120B to communicate with another component, such as another component of systems 100A and 100B. Communication device 530 may be a wireless communication device, such as an analog or digital communication device that allows enhanced tag device 500 to communicate via network 140. For example, communication device 530 may be a cellular communication device configured to communicate with other components through known cellular communication protocol. In other embodiments, communication device 530 may include an NFC device configured to communicate with devices within a range of enhanced tag device 500, such as a merchant device 130A located near a user 125 wearing enhanced tag device 500. In this way, enhanced tag device 500 may communicate with nearby components to provide and receive information in order to conduct a transaction.

In some embodiments, communication device 530 may include multiple communication devices, such as a device configured to communicate with a local network (e.g., NFC device) and a device configured to communicate with a global network (e.g., cellular network device, WIFI device, radio device, etc.). In this way, enhanced tag device 500 may communicate with multiple components of system 100A and 100B through more than one communication pathway (e.g., enhanced tag device 500 may communicate locally with a nearby merchant device 130A and remotely with financial service provider system 105).

Power source 550 may be an electrical power source configured to provide electrical power to one or more components of enhanced tag device 500. For example, power source 550 may be one or more rechargeable batteries. Processor 510 and memory 520 may be in communication with power source 550, such that enhanced tag device 500 may monitor a power level of power source 550. In some embodiments, enhanced tag device 500 may include multiple operating modes, which may depend on a power level of power source 550. For example, enhanced tag device 500 may include a normal-power operating mode and a low-power operating mode. In some embodiments, enhanced tag device 500 may include an unpowered operating mode, such as when no power from power source 550 is available.

Display 540 may be a screen device configured to display information to a user, such as user 125. I/O devices 560 may include additional devices that allow input or output of information. For example, I/O device 560 may include display 540 as part of a touch screen or may include a keyboard-type input device configured to allow user 125 to input information to enhanced tag device 500. I/O devices 560 may also include one or more digital and/or analog communication devices that allow enhanced tag device 500 to communicate with other machines and devices, such as other components of system 100 (such as communication device 530). In some embodiments, I/O devices 560 may also include biometric reader 562, sensory output device 564, and GPS device 566.

Biometric reader 562 may be any device configured to read and receive biometric input from a user, such as user 125. For example, biometric reader 562 may be configured to read biometric input such as skin conductivity, pulse rate, finger print, voice recognition, walking motion, etc. Biometric reader 562 may receive biometric input and transmit associated data to another component of enhanced tag device 500, such as memory 520.

In some embodiments, wearable tag device 500 may be configured to provide security features through use of biometric reader 562. For example, a likely identity of the user wearing enhanced tag device 500 and/or a possibility of fraud may be determined using biometric data receive via biometric reader 562. For example, processor 510 may execute a program to match received biometric data with biometric data stored in memory 520 to determine an identity of a person wearing the device and/or determine whether the wearer is the owner of the device. For example, enhanced tag device 500 may detect and analyze any of a user's finger print, voice print, skin conductivity, pulse rate, or the like for use in one or more security processes.

In other embodiments, biometric reader 562 may be a kinetic energy device, such as an induction coil. The kinetic energy device may monitor movements of the wearer of enhanced tag device 600. Enhanced tag device 500 may analyze data associated with the wearer's movements, which may be used in one or more security processes, such as a process to determine whether a potential transaction is fraudulent. In some embodiments, the kinetic energy device may be configured to convert kinetic energy into electrical energy, which may be stored and used by power source 550.

Sensory output device 564 may include one or more devices configured to provide an output through enhanced tag device 500. Output may be alternative to visual output through display 540. For example, output may include a vibration that may be felt by a wearer of enhanced tag device 500. In another example, output may include audible output that may be heard by a wearer of enhanced tag device 500 and/or another person in the vicinity. Output device 564, through these and/or other outputs may alert user 125, even if user 125 is not paying attention to enhanced tag device 500. Output device 564 may provide such an output to alert user 125 in particular instances, such as after a transaction using enhanced tag device 500 has occurred.

GPS device 566 may a global-positioning system device configured to determine a location of enhanced tag device 500. GPS device 566 may determine the location of enhanced tag device 500 using known global positioning processes. The location of the enhanced tag device 500 may be constantly monitored by GPS device 566, determined at predetermined intervals, or determined upon instruction from another component of enhanced tag device 500.

In certain embodiments, the functionality and component availability of an enhanced tag device 120B, such as enhanced tag device 500 may depend on a current operating mode. In the normal-power operating mode, power source 550 may hold sufficient electrical power to provide full functionality to enhanced tag device 500. In low-power operating mode, a power level of power source 550 may be below a threshold value, and some of the components and/or functionality of enhanced tag device 500 may be unavailable, due to insufficient electrical power to use the component or in order to preserve power for other components. In an unpowered operating mode, processor 510 and memory 520 may provide limited functionality through power provided through communication device 530, such as a passive RFID device.

In an exemplary embodiment, low-power operating mode of enhanced tag device 120B may correspond to basic tag device 120A. For example, in low-power operating mode, only processer 510, memory 520, communication device 530, and power source 550 may be available for use, similar to basic tag device 120A. An unpowered operating mode of enhanced tag device 120B may correspond to a basic tag device 120A that does not include a power source.

In some embodiments, basic tag device 120A and/or enhanced tag device 120B may allow for a stored-value capability. For example, enhanced tag device 120B in a low-power or unpowered operating mode may maintain functionality for some tag device transactions where RFID communication may be used to deduct a value stored on enhanced tag device 120B. In this way, a customer (e.g., user 125) may store a particular amount of money on enhanced tag device 120B that may be used when sufficient battery power for other types of transactions (e.g., those requiring enhanced tag device 120B to communicate directly with profile management device 110) is unavailable.

It should be understood that the configurations of basic tag device 120A and enhanced tag device 120B are exemplary and that other configurations are possible. Any tag device that stores information that may be remotely accessed by another device may be used in one or more processes described herein.

Figure 6:
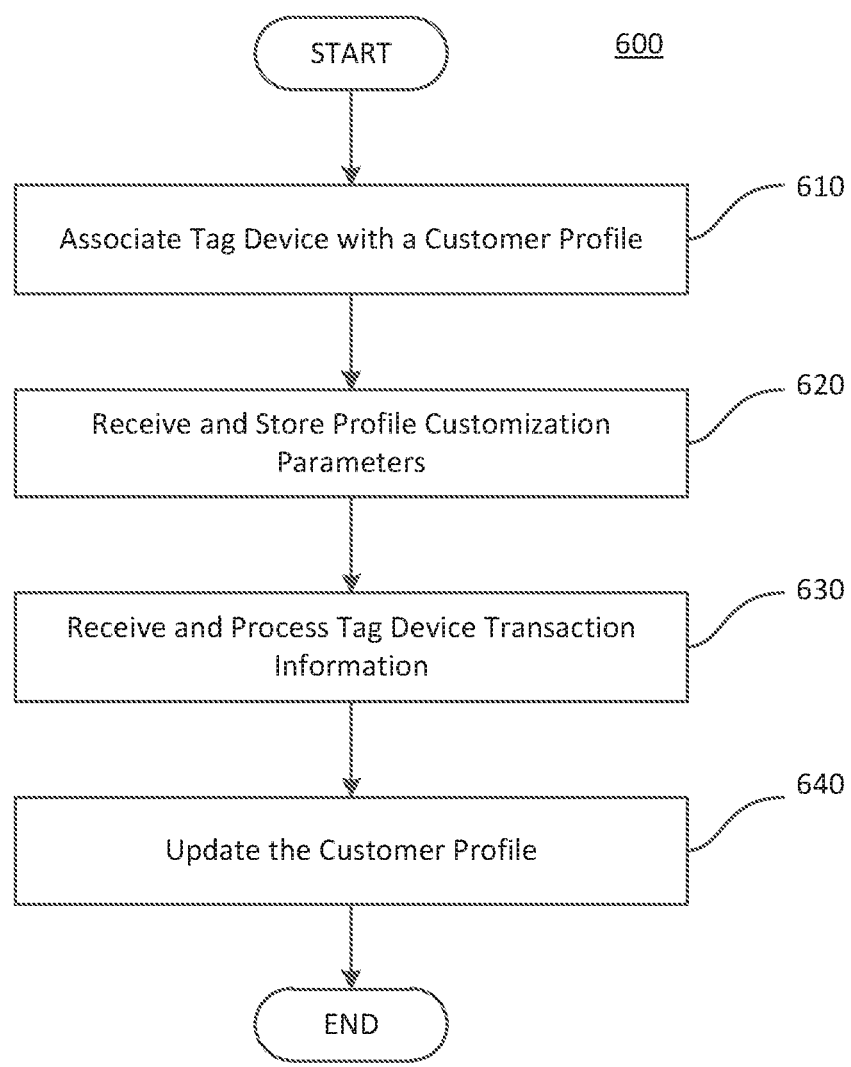
FIG. 6 is a flowchart of an exemplary process for using a customer profile and a detectable tag device to initiate and authorized customer transactions.

FIG. 6 depicts an exemplary process 600 for using a customer profile and a detectable tag device to initiate and authorize customer transactions, consistent with disclosed embodiments. In one embodiment, one or more components of systems 100A and/or 100B may execute software instructions to perform process 600 to initiate, authorize, process, and complete transactions using a detectable tag device, as well as maintain an updated customer profile associated with the detectable tag device. The tag device may be one or more basic tag devices 120A, one or more enhanced tag devices 120B, or a combination thereof. The tag device may be worn (or otherwise held, carried, and/or possessed) by user 125 and used to conduct one or more transactions (e.g., a financial transaction).

Profile management device 110 may store information that may be used in process 600. For example, profile management device 110 may store financial account information associated with user 125 as a customer profile. In an exemplary embodiment, profile management device 110 may associate the tag device with the customer profile (step 610). For example, a tag device identifier (e.g., product number, communication code, etc.) may be associated with the customer profile such that profile management device can determine the tag device from which received information was sent and/or identify the tag device referenced in information sent from another device (e.g., merchant device 130A). In this way, during a transaction, profile management device 110 may be configured to determine which customer profile should be used in a potential transaction.

In addition to associating the tag device with the customer profile, profile management device 110 may also receive and store profile customization parameters (step 620). Profile customization parameters may be any setting that may be used in one or more transaction processes. For example, profile customization parameters may be various rules for determining whether a potential transaction was authorized by one or more parties to the transaction and therefore should be processed and completed.

Profile customization parameters may include customer-input rules, such as rules indicating that the customer (e.g., user 125) has authorized a potential transaction. For example, customer-input rules may include rules authorizing automatic payment for certain transactions. In one particular example, a customer-input rule may include a rule indicating that every transaction in an amount under a particular value (e.g., $20) is authorized without additional input from the customer. Customer-input rules may also include specific rules for merchants, such as a list of merchants for which transactions are authorized by the customer and/or a list of merchants for which transactions are not authorized without additional input from the customer, or are never authorized. Customer-input rules may also include settings such as time period settings. A time period setting may include a time period (e.g., a week) over which each potential transaction is authorized by the customer, with the setting expiring after the time period. A similar setting may be applied to locations of potential transactions (e.g., authorizing all transactions in a particular area).

Profile customization parameters may also include merchant rules, which may indicate whether a particular merchant involved in a transaction has authorized the transaction. For example, merchant rules may include an setting input by a merchant and indicating that the merchant does not accept transactions using a tag device when certain criteria are met (e.g., a transaction amount over a particular value). Merchant rules may also include specific rules indicating that a particular user is accepted for use of a tag device for payments, which may be stored as part of that user's customer profile.

Profile customization parameters may further include financial service provider rules, which may indicate whether a financial service provider, such as a financial service provider that maintains a financial account associated with a tag device, has authorized a transaction. For example, financial service provider rules may include a setting that limits the transactions that may be conducted using the tag device, or that defines criteria required for permitted transactions (e.g., particular merchants, time periods, locations, etc.).

With the tag device associated with a customer profile, a customer (e.g., user 125 may use the tag device to conduct tag device transactions. Profile management device 110 may receive and process information about the tag device transactions (step 630). For example, after a potential transaction is initiated, profile management device 110 may receive, process, and transmit information in order to process the transaction, including determining whether the potential transaction is authorized by the customer, the merchant, and/or the financial service provider associated with the transaction. Authorized transactions may be processed and completed.

In some embodiments, profile management device 110 may update the customer profile based on use of the tag device (step 640). For example, profile management device 110 may receive data associated with potential transactions and/or completed transactions made using the tag device. Based on the data, profile management device 110 may update the customer profile, which may include updating one or more profile customization parameters. For example, if a customer profile includes a rule indicating that each first transaction with a merchant requires additional input before it can be authorized, profile management device 110 may update the customer profile to reflect that the first transaction with the merchant has been completed (and thus each subsequent potential transaction is authorized without additional input). Profile management device 110 may dynamically manage a plurality of customer profiles, including updating profiles based on any data received in order to improve various processes subsequently performed.

Through exemplary process 600, a detectable tag device may be used to conduct transactions. The detectable tag device (which may be one or more basic tag device 120A and/or enhanced tag devices 120B), merchant device 130A, 130B, and/or 130C, profile management device 110, and/or financial service provider system 105 (which may or may not include profile management device 110) may communicate with each other to initiate and authorize transactions using the tag device. In an exemplary embodiment, the components may be configured to automatically initiate a transaction without input from a user. A component, such as profile management device 110, may analyze the potential transaction to determine if it is authorized by the customer, the merchant, and/or the financial service provider. The determination may be based on information stored as the customer profile, including the financial account associated with the tag device and profile customization parameters. As the tag device is used to conduct transactions, information may be gathered to update the customer profile and improve the processes involved.

Figure 7:
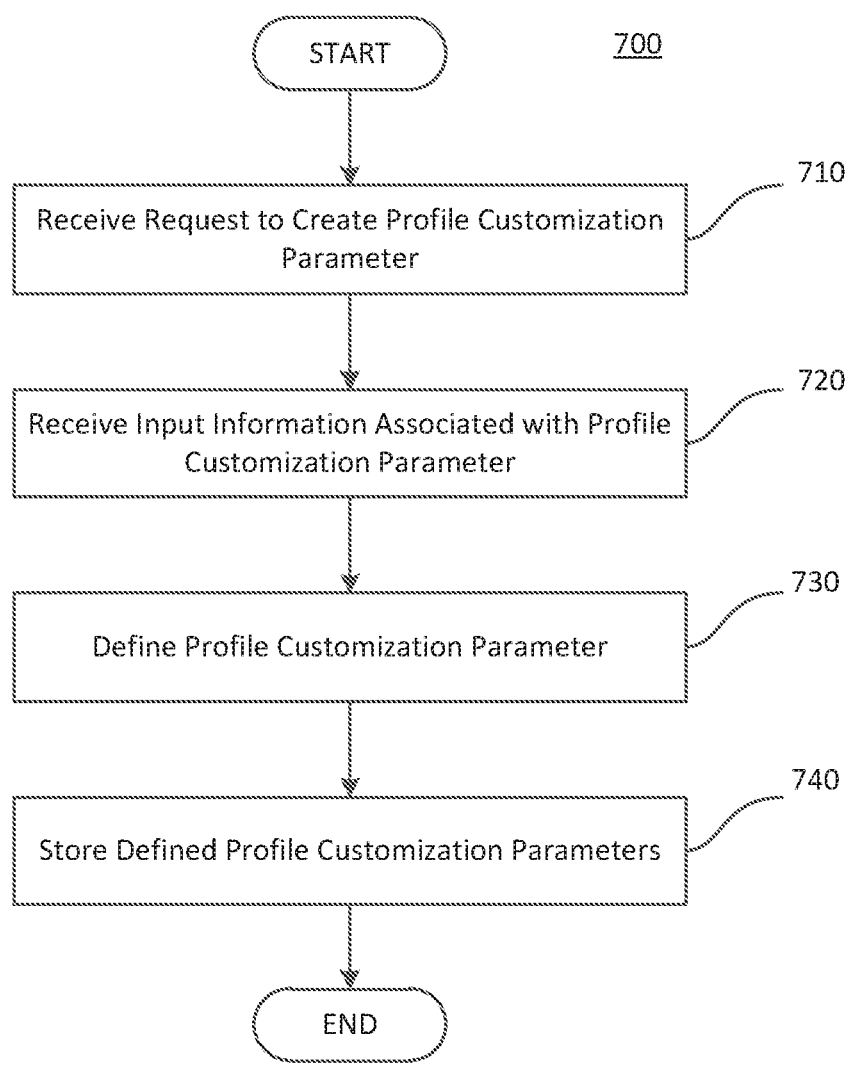
FIG. 7 is a flowchart of an exemplary customer profile setup process, consistent with disclosed embodiments.

FIG. 7 depicts a flowchart of an exemplary customization parameter setup process 700, consistent with disclosed embodiments. In one embodiment, one or more components of system 100A and/or 100B, such as profile management device 110, may execute software instructions to perform process 700 to create profile customization parameters associated with a customer profile. In some embodiments, tag device transaction process 700 may correspond to step 620 of process 600.

As has been described, profile management device 110 (or another component such as enhanced tag device 120B) may use profile customization parameters to process a transaction, including determining various aspects of a transaction, such as whether a potential transaction is authorized by the parties involved, including the customer, the merchant, and the financial service provider. Other aspects that profile management device 110 may determine include the amount of the transaction, whether a customer should be notified of the transaction, etc.

In some embodiments, profile management device 110 may receive a request to create a profile customization parameter associated with a particular customer profile (step 710). For example, profile management device 110 may receive a request from a client device based on input from user 125. The request may indicate that user 125 is a customer associated with a particular customer account and that user 125 is providing information that may be used to generate a profile customization parameter. In other examples, the request may be based on input from a merchant (e.g., merchant A, B, or C) and/or a financial service provider (e.g., a financial service provider associated with financial service provider system 105). Merchant requests and financial service provider requests may be specific to the particular customer profile (e.g., the associated customer is permitted to use a tag device for transactions with the requesting merchant) and/or may be general to multiple customer profiles, of which the customer profile is one (e.g., all customers associated with a financial service provider are permitted to use a tag device for transactions with the requesting merchant). Profile management device 110 may access relevant customer profile(s) in order to modify them with the profile customization parameter.

In addition to the request, profile management device 110 may receive input information associated with one or more profile customization parameters (step 720). For example, profile management device 110 may receive specific information that may be used to define one or more profile customization parameters. Another component of system 100A and/or 100B may receive the information as input from a user (such as user 125, a user associated with a merchant A, B, or C, a user associated with financial service provider system 105, or some other user) and may send the information to profile management device 110.

In the example of input from user 125, a client device (e.g., laptop, smartphone, tablet, enhanced tag device 120B, etc.) may receive information input by user 125 and may transmit the information to profile management device 110. For example, user 125 may enter information to a smartphone that includes a financial service provider mobile application. The financial service provider application may include an interface that allows user 125 to enter information that may be used to define a profile customization parameter.

One example of user-input information is customer-input information related to customer-input rules described above. In one example, customer-input information that may be used to define one or more profile customization parameters includes amount information (e.g., information indicating transactions for particular amounts are either authorized, unauthorized, require additional input, etc., such as information indicating that all transactions over $1000 are not authorized, transactions under $20 are authorized, etc.). Another example of customer-input information may include merchant information (e.g., a list of merchants for which transactions are authorized, unauthorized, etc.). Still other examples of customer-input information include location information (e.g., particular areas for which transactions are authorized, unauthorized, etc.), time period information (e.g., a period of time for which a particular set of parameters apply, such as authorize all transactions that take place over the next week, etc.), and any other information that may be used to determine what actions should be taken with regard to potential transactions that take place using the tag device. In this way, profile management device 110 may use customer-input information to define profile customization parameters that allow profile management device 110 to determine whether the customer has authorized a potential transaction that subsequently occurs or whether another action should occur (e.g., additional authorization is necessary).

In another example, customer-input information may be used to define a profile customization parameter that affects the result of a transaction. For example, a customer may provide information indicating the amount of a tip that should be included in the amount of a transaction for certain merchants (e.g., taxis, restaurants, and other merchants where a tip is customary).

Similarly, customer-input information may be used to define a profile customization parameter that allows the customer to initiate a transaction based on certain actions associated with the tag device but not necessarily associated with the transaction. For example, various client devices may be arranged to detect actions taken by a tag device in a manner similar to that of merchant devices 130A-C. For example, a client device may detect every time a tag device enters and exits user 125's vehicle. The customer (e.g., user 125) may input information that is received by profile management device 110, the information indicating particular transactions that should be initiated based on information sent from these client devices. For example, the customer may input information indicating that a certain amount of money should be transferred from a checking account to a savings account every time a tag device enters the customer's vehicle. In this way, the customer can customize transactions based on their everyday actions.

Through profile customization parameters based on customer-input information, profile management device 110 may be configured to determine certain aspects of a transactions, such as whether a potential transaction was authorized by the customer involved (e.g., user 125 wearing a tag device). Additionally or alternatively, profile management device 110 may define profile customization parameters based on input from other users, which may include merchant information and/or financial service provider information, and may use the information to determine other aspects of a transaction, such as whether a potential transaction is authorized by the merchant and financial service provider.

For example, a merchant (e.g., merchant A) may decide that it will only accept payments using a tag device if the amount of the transaction is below a certain amount (e.g., $50). This information may be transmitted to profile management device 110 to define an associated profile customization parameter that may be used in subsequent potential transaction processing to achieve the desired effect (e.g., transactions below the certain amount are authorized by the merchant, while transactions over the amount are denied).

In another example, merchant-input information may include information that profile management device 100 may use to determine another aspect of a potential transaction. For example, a merchant may decide to provide a discount to certain transactions that occur using a tag device. For example, the merchant may provide a discount to every fifth transaction in which a customer uses a tag device. Profile management device 110 may define a profile customization parameter that may be used to determine the associated aspect (e.g., the amount of a transaction).

Similarly, a user associated with a financial service provider may input information that profile management device 110 may use to define a profile customization parameter. In one example, the user may input information indicating that a financial account associated with the customer is authorized by the financial service provider for use in tag device transactions, which amounts are authorized by the financial service provider, with which merchants etc. In another example, the user may input information, such as an algorithm, that may define a determination process for assessing whether a transaction is authorized by the financial service provider. For example, the information may include a credit risk analysis algorithm. Profile management device 110 may use the algorithm to perform a credit risk analysis to determine whether a potential transaction (such as a large transaction associated with a credit account) is authorized by the financial service provider.

Based on the received information, profile management device 110 may define a profile customization parameter (step 730). Profile management device 110 may define the parameter through one or more processes to convert received information into a rule that can be used to achieve a desired effect of the information (e.g., the customer authorizes all transaction under $20). In some instances, received information may be combined into data rules that satisfy multiple desired effects. For example, user-input information indicating particular amounts and a list of merchants that are authorized may be combined into a rule that only authorizes potential transactions that satisfy both requirements (e.g., to authorize transactions under $20 if with merchant A, B, or C). Information from customers, merchants, and/or financial service providers may also be combined into rules. It should be understood however, that each piece of information received from a user may defined as an separate individual rule.

Profile management device 110 may store defined profile customization parameters (step 740). For example, profile management device 110 may store parameters defined in step 730 in a memory device. Profile management device 110 may store each parameter in a form that may be used in a subsequent process for determining one or more aspects of a potential transaction (e.g., whether the transaction is authorized). Profile management device 110 may store profile customization parameters in a memory and/or database.

Figure 8:
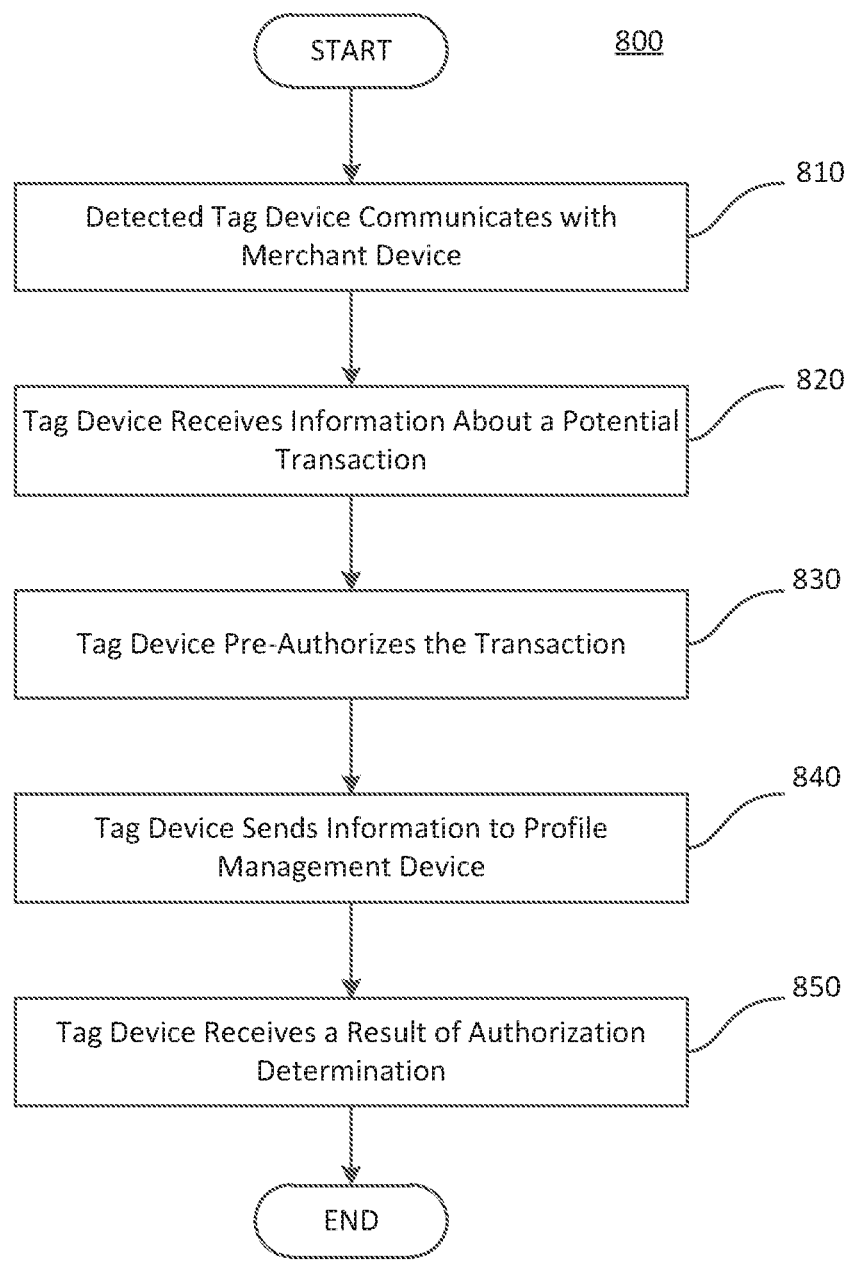
FIG. 8 is a flowchart of an exemplary tag device transaction process.

FIG. 8 depicts a flowchart of an exemplary tag device transaction process 800, consistent with disclosed embodiments. In one embodiment, a tag device, such as a basic tag device 120A and/or an enhanced tag device 120B may perform at least some of the steps of process 800 when user 125 uses the tag device in a tag device transaction.

In exemplary embodiments, user 125 may go about their daily activities while wearing (or carrying) at least one tag device. At some point, user 125 may enter or otherwise interact with a merchant environment, such as a merchant building, a vehicle, an event, etc. Some interactions may cause a merchant device (or other component of systems 100A and 100B, including the tag device itself) to detect the tag device (e.g., the tag device is in a particular location) and/or an action of the tag device (the tag device moved from one point to another). Additional details regarding detection of tag device transactions will be discussed in more detail in the description of FIG. 9.

After detection, the merchant device may communicate with the detected tag device (step 810). The tag device and merchant device may communicate via any communication pathway that exists between the two components. For example, the tag device may communicate with the merchant device via a NFC network, a WIFI network, mating RFID devices, or some other network, including network 140. The particular communication pathway may be dependent on the configuration of the tag device, including its operating mode, and the configuration of the merchant device, including the type of sensor device used to detect the tag device.

In certain embodiments, the tag device may receive information about a potential transaction that may be associated with the detection of the tag device (step 820). For example, the tag device may receive information indicating that it was detected in a building that requires an entry fee. The received information may identify the merchant and other aspects of the transactions, such as the amount of the entry fee. Alternatively or additionally, the merchant device may receive information from the tag device identifying the tag device and/or user 124.

In some embodiments, the tag device (and/or the merchant device) may pre-authorize the transaction (step 830). For example, the tag device may store a customer profile in a memory device, which the tag device may compare to received information about a potential transaction to determine whether the customer has authorized the transaction or the type of transaction that may occur. In another example, the merchant device may determine whether the transaction is pre-authorized by the merchant. In some aspects, pre-authorization may occur before all details of a transaction are known. For example, user 125 may enter a retail store wearing a tag device. The entrance into the store may be detected by a merchant device, which may determine whether the tag device is authorized for any transactions at the store, and, if so, the parameters of the allowable transactions. In some embodiments, the tag device may alert user 125 of which transactions are authorized (e.g., purchases under a particular amount are allowed by the merchant). In this way, customers may be aware of limitations on tag device transactions.

If a transaction is pre-authorized (or pre-authorization is not required), the tag device (and/or merchant device) may send information about a potential transaction to profile management device 110 (step 840). The information may include information identifying the tag device, the customer, the merchant device, the merchant. The information may also include information about the transaction, such as amount information, receipt information (e.g., item purchased, service provided, price of item or service), time information, location information, date information, etc. Profile management device 110 may process the received information to determine if the potential transaction is authorized by the customer, the merchant, and/or the financial service provider.

In some instances, the tag device may receive a result of the authorization determination (step 850). The tag device may receive the result directly from profile management device 110, or from another component (e.g., the merchant device). In some instances, the result may indicate that the transaction was authorized, completed, unauthorized, not completed, etc.

In other instances, the result may indicate that additional information is required. For example, the result may indicate that additional authorization from user 125 is required. The tag device may receive the additional information and send it to profile management device 110. In some situations, the tag device may receive a subsequent result, such as a result of processing by profile management device 110 after receiving requested additional information. For example, the tag device may receive an indication that the additional information was accepted and the transaction was completed.

The tag device may indicate a result of the transaction in any number of ways. For example, an enhanced tag device 500 may use display 540 (e.g., to display transaction information), sensory output device 564 (e.g., to vibrate after a transaction is completed), or any other I/O device 560.

It should be understood that one or more other components of systems 100A and 100B may be configured to perform one or more of the steps of process 800 to conduct a tag device transaction. For example, the tag device may communicate with profile management device 110 through the merchant device.

Figure 9:
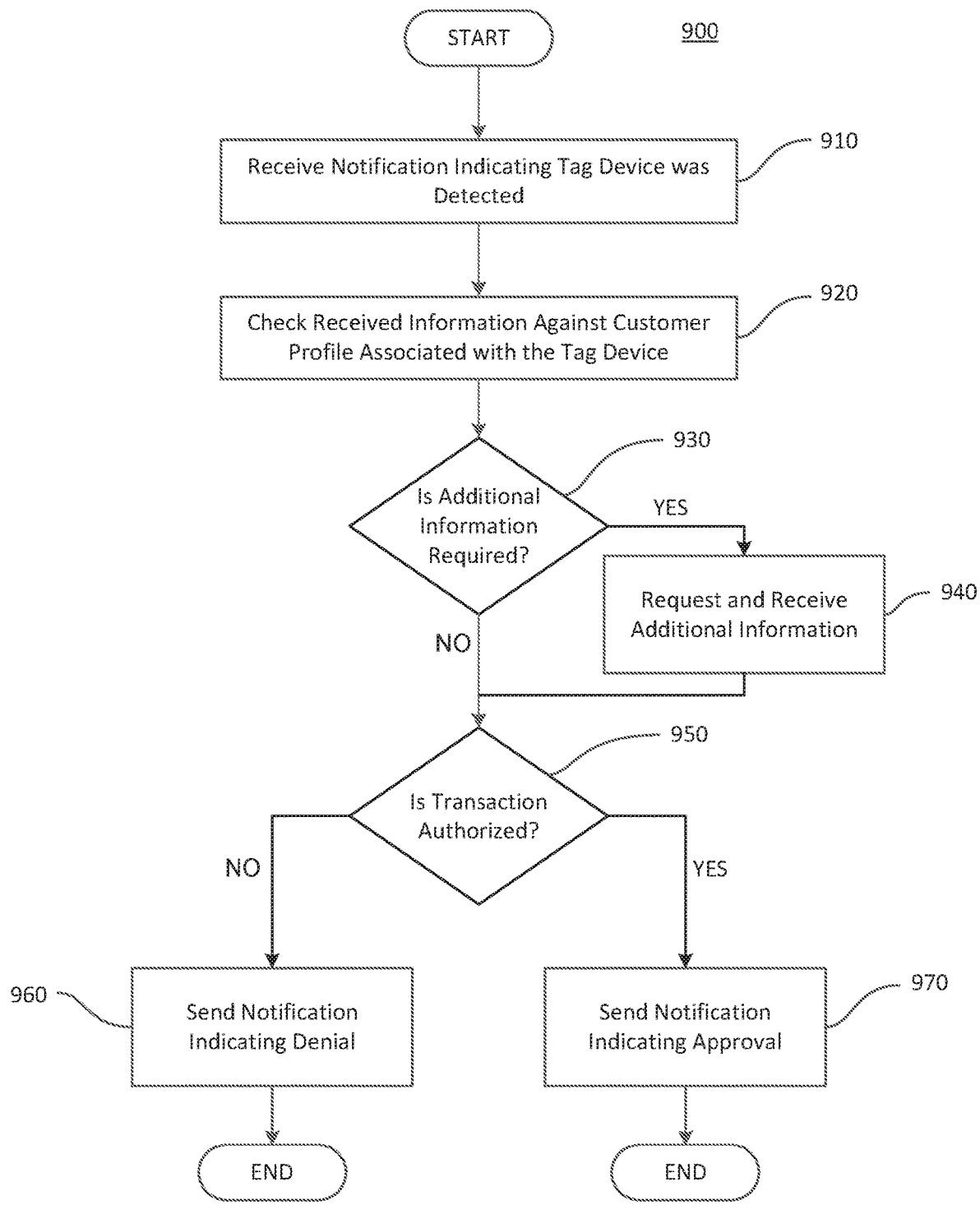
FIG. 9 is a flowchart of an exemplary tag device authorization process, consistent with disclosed embodiments.

FIG. 9 depicts a flowchart of an exemplary tag device transaction authorization process 900, consistent with disclosed embodiments. In one embodiment, one more components of system 100A and/or 100B may perform process 900 to determine whether a potential tag device transaction is authorized by one or more parties to the transaction. For example, profile management device 110 may execute software instructions to perform at least part of process 900 to process a tag device transaction. In some embodiments, tag device transaction process 900, in combination with process 800, may correspond to step 630 of process 600.

As has been described, a tag device transaction may be any transaction using a tag device (such as basic tag device 120A and/or enhanced tag device 120B). In an exemplary embodiment, tag device transactions may be initiated automatically, without requiring user input. Some of these transactions may be authorized automatically, while others may require some user input. Examples of tag device transactions, which have already been described, include merchant transactions, such as entry-fee transactions, transportation transactions, and retail purchase transactions, which may be associated with merchants A, B, and C, respectively. Tag device transactions may also include transactions that do not necessarily involve a merchant, such as a transfer of funds between two non-merchant financial accounts, such as from a first account of user 125 to a second account of user 125, or from an account of user 125 to another person's account (i.e., a peer-to-peer transaction). It should be understood however, that tag device transactions are not limited to these examples.

Tag device transactions may occur based on initiating actions of a tag device, such as those imparted on a tag device by a user (e.g., user 125) while the user is wearing the tag device. For example, user 125 may walk into a museum with the tag device. The museum may be configured for tag device transactions through the configuration of one or more merchant devices (e.g., merchant devices 130A). The merchant devices 130A may be configured to detect a tag device (e.g., with one or more sensor devices) that has moved into a particular location within the museum (e.g., crossed a line in front of the entrance). The museum may be arranged with signage that indicates to potential customers that a tag device transaction may occur if they cross the line.

In another example, a subway system includes one or more merchant devices (e.g., merchant devices 130B) configured for use in a tag device transaction. Merchant devices 130B may be configured to detect a tag device as it moves throughout the subway system (e.g., enters a subway station, enters a subway car, exits a subway car, exits a subway station, etc.).

In yet another example, a retail store may include one or more merchant devices (e.g., merchant devices 130C) configured for use in a tag device transaction. Merchant devices 130C may be configured to detect a tag device as it enters and/or exits the retail store. In some embodiments, merchant device 130C may also be configured to detect retail items that the user intends to purchase.

After or as the tag device is used in an initiating action, profile management device 110 may receive information indicating that a tag device transaction was detected by a merchant device (or other component of system 100A or 100B) (step 910). In particular, profile management device may receive a notification indicating that a detectable device (e.g., a tag device) was wirelessly detected by a merchant device in a potential transaction. For example, merchant device 130A may detect that a tag device has crossed a payment line near the entrance to a building requiring an entry fee. Merchant device 130A may communicate with the tag device to send and receive information that initiates a potential transaction. For example, the tag device may transmit identifying information to merchant device 130A, which merchant device 130A may transmit to profile management device 110. Merchant device 130A may also transmit transaction information to profile management device 110, such as merchant-identifying information, amount information, location information, etc.

In some embodiments, merchant device 130A may additionally or alternatively transmit transaction information to the tag device, such as an enhanced tag device 120B. The tag device may use the information to determine whether the transaction is pre-authorized, such as by checking the information against a customer profile stored by the tag device. In some instances, the tag device may display transaction information to user 125, such as to inform the user about a potential transaction that was initiated. The tag device may also communicate with profile management device 105, such as to transmit a notification that the tag device was detected in a potential transaction (e.g., instead of or in addition to merchant device 130A notifying profile management device 105).

In some embodiments, the tag device may receive input from user 125, such as information indicating that the potential transaction should be canceled, the potential transaction is authorized by user 125, and the like. In other embodiments, the tag device may determine whether the wearer of the device is an authorized user 125, such as by reading biometric data through biometric reader 602 and checking it against stored biometric data. In this way, the tag device may first filter potential transactions for initial authorization. It should be understood however, that the tag device may not receive any information from merchant device 120A or other device, or may not display it to the user.

In some embodiments, such as those including enhanced tag device 500, biometric reader 562 may read biometric data and transmit the data to merchant device 130A and/or profile management device 110, as additional information related to a potential transaction. Also, sensory output device 564 may provide sensory output (e.g., a vibration or audible sound) indicating that a potential transaction was initiated.

In some instances, an enhanced tag device 120B may transmit transaction information to profile management device 110. In some aspects, these instances may correspond to transactions in which input from user 125 is necessary to process the transaction. For example, if user 125 would like to pay for only a portion of a transaction (e.g., if user 125 is splitting a bill at a restaurant), user 125 may enter information to enhanced tag device 120B indicating the portion and/or amount that should be charged using the financial account associated with the tag device. In another example, user 125 may use enhanced tag device 120B to send information about items to be purchased. For example, enhanced tag device 120B may take a picture of an item, the item's barcode, or another identifying characteristic, which enhanced tag device 120B may transmit to profile management device 110 for use in transaction processing.

Profile management device 100 may receive the information related to a potential tag device transaction and use the information to determine whether the potential transaction is authorized by the customer, the merchant, the financial service provider, and/or any other party whose authorization is relevant to processing of the transaction (e.g., a processing entity).

In one embodiment, profile management device 110 may determine a customer profile associated with a tag device based on received information and check received information against a customer profile associated with the tag device (step 920). For example, profile management device 110 may compare received information associated with a potential transaction to stored profile customization parameters associated with the customer profile to determine whether a potential transaction is authorized by the customer, the merchant, and the financial service provider.

In some embodiments, profile management device 110 may check certain received information against the customer profile as part of one or more security processes, such as to prevent fraudulent use of the tag device. For example, the received information may include biometric data collected through biometric reader, which profile management device 110 may check against stored biometric data to ensure that the person using the tag device is an authorized customer associated with the tag device.

In another example, profile management device 110 may analyze characteristics of the potential transaction to determine whether it is the type of transaction that is likely to be authentic. For example, profile management device 110 may compare received location information and time information with historical information to determine if the current potential transaction is an outlier (and therefore possibly fraudulent).

Another security process may include profile management device 110 identifying information from more than one tag device involved in the transaction. For example, user 125 may wear a plurality of tag devices (e.g., an enhanced tag device 120B on their wrist, and one or more basic tag devices 120A on different pieces of clothing) while taking an initiating action that is detected by a merchant device. The merchant device may transmit information about each tag device to profile management device 110. Profile management device 110 may determine whether the potential transaction is authorized based at least in part on this information. For example, profile customization parameters may indicate the number of tag devices required for particular transactions, and profile management device 110 may determine whether the number of tag devices used for the potential transaction being considered is above a threshold. In this way, different types of transactions may be subject to different levels of security (e.g., more tag devices required for more expensive transactions).

In some instances, a potential transaction may require additional information before an authorization determination can be made. Based on received information, profile management device 110 may determine whether additional information is required (step 930). For example, profile management device 110 may receive information related to a potential transaction indicating that a customer has entered an area of merchant A that caused the transaction to be initiated. Profile management device 110 may determine the customer profile associated with the tag device, and determine that the potential transaction is the first transaction attempt the tag device has made with merchant A. The customer profile may include a profile customization parameter indicating that a first transaction attempt with a merchant must be authorized with additional input from the customer (e.g., user 125). Based on this information, profile management device 110 may determine that additional information is required before the potential transaction is authorized (e.g., authorized by the customer).

In another example, profile management device 110 may require additional information about the transaction. For example, in the example of merchant C being a retail store, profile management device 110 may require additional information about the retail item or items that user 125 intends to purchase with the tag device transaction. Merchant device 130C may transmit information indicating the total price of the items, for example, which may allow profile management device 110 to determine whether the tag device transaction is authorized.

If profile management device 110 determines that additional information is required (step 930—YES), profile management device 110 may communicate with another component of system 100A or 100B to request and receive the additional information (step 940). For example, profile management device 110 may transmit a request to an enhanced tag device 120B, which enhanced tag device 120B may display to user 125. The enhanced tag device 120B may receive input from user 125 (e.g., input indicating that the transaction is authorized) and may transmit the associated information back to profile management device 110. If profile management device 110 fails to receive the additional information (e.g., after a predetermined period of time), profile management device 110 may cancel the potential transaction.

If additional input is not required (step 930—NO) and/or after receiving the requested additional input (step 940), profile management device 110 may determine whether the transaction is authorized (step 950). For example, profile management device 110, after receiving information indicating that a tag device has crossed into a particular area in a museum, may determine that the potential transaction with merchant A is an authorized transaction (e.g., the transaction is authorized by each of the customer, the merchant, and the financial service provider). In an exemplary embodiment, profile management device 110 may determine that the transaction is authorized based on stored profile customization parameters.

In the example of merchant B, after user 125 enters a subway station, profile management device 110 may determine that the tag device being worn by user 125 is authorized for use in subway system transactions (e.g., to pay for the subway ride). The tag device and merchant device 130B may continue to collect information as the tag device (and user 125) moves throughout the subway system. The tag device and/or a merchant device 130B may transmit the additional information to profile management device 110, which may continuously make authorization determinations to ensure that user 125 pays for the particular transportation provided.

In the example of merchant C, after a user crosses a line near the entrance/exit of the retail store, profile management device 110 may determine that the tag device is authorized for tag device transactions at that retail store. The tag device and/or merchant device 130C may also receive information associated with the transaction (such as the items to be purchased) and transmit the information to profile management device 110 for additional authorization determinations.

If profile management device 110 determines that the tag device transaction is not authorized (step 950—NO), profile management device 110 may transmit a notification to the merchant device and/or tag device (step 960). The merchant device and/or tag device may subsequently perform one or more processes to ensure that the transaction does not occur. For example, user 125 may be denied entry to the museum, the subway, or the retail store, unless an alternative form of payment is provided. In some embodiments, a merchant device and/or tag device may provide output to notify an employee and/or user 125 that the potential transaction was not authorized (e.g., an audible alarm).

If profile management device 110 determines that the tag device transaction is authorized (step 950—YES), profile management device 110 may process the potential transaction (step 970) by transmitting a notification to a component of financial service provider system 105 indicating that a transaction was authorized. For example, profile management device 110 may communicate with a component of financial service provider system 105, which may execute software instructions to perform one or more processes to transfer funds that completes the transaction (e.g., payment provided to the museum, subway system, or retail store).

In some embodiments, authorized transactions may require additional information to process the transaction. For example, profile management device 110 may determine that user 125 is authorized to pay for use of the subway system using the tag device, which may grant user 125 entry to a subway car. The amount of the transaction, however, may depend on the location where user 125 exits the subway system. A merchant device 130B may detect a location that the tag device exits the subway system, and transmit that information to profile management device 110 for determination of a transaction amount.

In the example of the retail store, a merchant device 130C may detect the retail items that user 125 left the retail store with, calculate a total cost of the items, and transmit the amount to profile management device 110. In one embodiment, each item that may be purchased may include a device that allows the tag device and/or merchant device 130C to determine that user intends to purchase the item. For example, merchant device 130C may determine that a user intends to purchase an item based on a proximity of the device included with the item to the user's tag device as the user approaches an exit of the retail store.

After the transaction has been processed (e.g., a payment made from a financial account), profile management device 110 may provide feedback to user 125 and/or the merchant. For example, profile management device 110 may send a notification to the tag device (e.g., enhanced tag device 500), which may provide sensory feedback to user 125 (e.g., a vibration or audible sound using sensory output device 564). In another example, the feedback may be provided to the merchant, such that the merchant is informed that the payment was made.

Profile management device 110 may manage information associated with processed transactions. For example, profile management device 110 may provide information about processed transactions to user 125, merchants, and/or financial service providers. In this way, users may review information about completed tag device transactions and make determinations that may improve various processes. In addition, profile management device 110 may use information about completed transactions to update customer profiles (e.g., as described above with respect to step 640 of process 600).

In some embodiments, a user may use a tag device in one or more transactions that do not include a merchant. For example, user 125 may use an enhanced tag device 120B to transfer money to another person (e.g., peer-to-peer transaction). The enhanced tag device 120B may receive information about the transaction from user 125 (e.g., amount of transaction). The enhanced tag device 120B may also detect a device associated with the other person involved in the transaction, such as a tag device worn by that person. Enhanced tag device 120B may collect information about the other tag device and transmit the information to profile management device 110. Profile management device 110 may use the received data and a customer profile associated with each person involved in the transaction to determine whether the transaction is authorized, and, if so, process the transaction.

In other embodiments, a tag device may be configured for use in one or more online transactions. For example, user 125 may use a client device (e.g., laptop, smartphone) to purchase an item over the Internet. The client device may communicate with an enhanced tag device 120B that is worn by user 125 to initiate and authorize the transaction, such as based on a proximity from the tag device to the client device. In this way, an online transaction may be automatically conducted without the need for user 125 to enter identifying information to the client device.

The exemplary disclosed embodiments provide customers and merchants with an improved system for conducting transactions. Customers may transact with merchants automatically using a detectable tag device, which may, in at least some situations, eliminate the need for direct interaction between the customer and the merchant, saving time and money for both. Further, since transactions may be authorized based on stored parameters, potential transactions may be processed without additional input from the customer. In this way, the customer experience of using a financial account may be improved.

The exemplary disclosed embodiments describe systems and methods for initiating and authorizing a transaction using a detectable device. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of non-transitory computer-readable media, such as secondary storage devices, like hard disks, floppy disks, or CD-ROM, or other forms of RAM or ROM.

It is intended, therefore, that the specification and examples be considered as example only, with a true scope and spirit being indicated by the following claims and their full scope of equivalents.

What is claimed is:

1. A merchant system for detecting tag devices and notifying a customer of pre-authorized sale offers, comprising:
   one or more memory devices storing instructions; and
   one or more processors configured to execute the instructions to perform operations comprising:
      detecting an electromagnetically detectable customer tag device;
      receiving a customer profile associated with the electromagnetically detectable customer tag device, the customer profile comprising financial account information;
      pre-authorizing a sale offer for the customer based on the customer profile;
      detecting the tag device entering a merchant venue associated with the merchant system;
      associating the tag device with the customer profile;
      transmitting to the tag device a notice of the pre-authorized sale offer based on the customer profile;
      receiving a response from the customer via the tag device;

determining whether the pre-authorized sale offer is authorized by the customer, based on the response; and processing the pre-authorized sale offer based on the determination.

2. The system of claim 1, wherein the operations further comprise transmitting a result of the determination to at least one of the tag device, a merchant device associated with the merchant system, or a financial service provider system.

3. The system of claim 1, wherein the tag device is incorporated into or otherwise attached to a wearable item.

4. The system of claim 3, wherein the wearable item comprises at least one of a wristband, jewelry, eyeglasses, sunglasses, a watch, a piece of clothing, or a belt.

5. The system of claim 1, wherein detecting the tag device entering the merchant venue comprises determining an operating mode of the tag device.

6. The system of claim 5, wherein the operations further comprise providing power to the tag device if the determined operating mode requires power.

7. The system of claim 1, wherein the operations further comprise:

receiving a discount notification from a third-party vendor associated with the customer profile; and pre-authorizing a sale offer for the customer based on the customer profile and the received discount notification.

8. A computer-implemented method for detecting tag devices and notifying a customer of pre-authorized sale offers, the method comprising:

detecting an electromagnetically detectable customer tag device;

receiving a customer profile associated with the electromagnetically detectable customer tag device, the customer profile comprising financial account information;

pre-authorizing, by one or more processors, a sale offer for the customer based on the customer profile;

detecting, by the one or more processors, the tag device entering a merchant venue associated with the merchant system;

associating, by the one or more processors, the tag device with the customer profile;

transmitting, by the one or more processors, to the tag device a notice of the pre-authorized sale offer based on the customer profile;

receiving a response from the customer via the tag device;

determining, by the one or more processors, whether the pre-authorized sale offer is authorized by the customer based on the response; and processing, by the one or more processors, based on the determination, the pre-authorized sale offer.

9. The computer-implemented method of claim 8, further including transmitting a result of the determination to at least one of the tag device, a merchant device associated with the merchant system, or a financial service provider system.

10. The computer-implemented method of claim 8, wherein the tag device is incorporated into or otherwise attached to a wearable item.

11. The computer-implemented method of claim 10, wherein the wearable item is at least one of a wristband, jewelry, eyeglasses, sunglasses, a watch, a piece of clothing, or a belt.

12. The computer-implemented method of claim 8, wherein detecting the tag device entering the merchant venue comprises determining an operating mode of the tag device.

13. The computer-implemented method of claim 12, further including providing power to the tag device if the determined operating mode requires power.

14. The method of claim 8, further comprising:

receiving a discount notification from a third-party vendor associated with the customer profile; and pre-authorizing, by one or more processors, at least one sale offer for the customer based on the customer profile and the received discount notification.

15. A wearable device for notifying a customer of pre-authorized sale offers:

one or more memory devices storing instructions; and one or more processors configured to execute the instructions to perform operations comprising:

receiving a customer profile including financial account information;

entering a merchant venue associated with a merchant system;

receiving a first notification of a pre-authorized sale offer based on the customer profile;

receiving a response from a customer;

transmitting the response to the merchant system; and receiving a second notification of a processed sale offer.

16. The wearable device of claim 15, wherein the wearable device is at least one of a wristband, jewelry, eyeglasses, sunglasses, a watch, a piece of clothing, or a belt.

17. The wearable device of claim 15, wherein the operations further comprise utilizing power from a merchant device.

18. The wearable device of claim 15, wherein the operations further comprise detecting a plurality of tags in merchant venue.

19. The wearable device of claim 16, wherein the operations further comprise:

locating the plurality of tags in merchant venue; and notifying the customer of the location of plurality of tags.

* * * * *